United States Patent
Tanaka et al.

(10) Patent No.: US 8,165,465 B2
(45) Date of Patent: Apr. 24, 2012

(54) APPARATUS AND METHOD OF CONTROLLING TAP COEFFICIENT OF TRANSVERSAL FILER, OPTICAL RECEIVER APPARATUS, AND OPTICAL COMMUNICATION SYSTEM

(75) Inventors: Toshiki Tanaka, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 12/397,755

(22) Filed: Mar. 4, 2009

(65) Prior Publication Data
US 2009/0226165 A1    Sep. 10, 2009

(30) Foreign Application Priority Data
Mar. 6, 2008 (JP) ................. 2008-056557

(51) Int. Cl.
*H04B 10/08* (2006.01)
(52) U.S. Cl. ............ 398/25; 398/26; 398/102; 398/141; 398/202

(58) Field of Classification Search .............. 398/25–26, 398/141, 202
See application file for complete search history.

(56) References Cited

U.S. PATENT DOCUMENTS

| | | | |
|---|---|---|---|
| 5,519,676 A * | 5/1996 | Kitahara | 369/47.26 |
| 2004/0130995 A1* | 7/2004 | Nakajima et al. | 369/59.22 |
| 2007/0171312 A1* | 7/2007 | Kishi | 348/726 |

FOREIGN PATENT DOCUMENTS

JP    2007-325095    12/2007

* cited by examiner

*Primary Examiner* — Dung Nguyen
(74) *Attorney, Agent, or Firm* — Staas & Halsey LLP

(57) ABSTRACT

An apparatus includes an oscillator circuit configured to generate a certain oscillation signal, an adder configured to add the oscillation signal to the tap coefficient of any of one or more taps of the transversal filter, a signal-quality measurer configured to measure a signal quality of a signal output from the transversal filter, and a tap-coefficient adjuster configured to control the value of the tap coefficient so that an optimal amount of shift in the signal quality of the output signal is achieved when the oscillation signal is added to the tap coefficient.

10 Claims, 19 Drawing Sheets

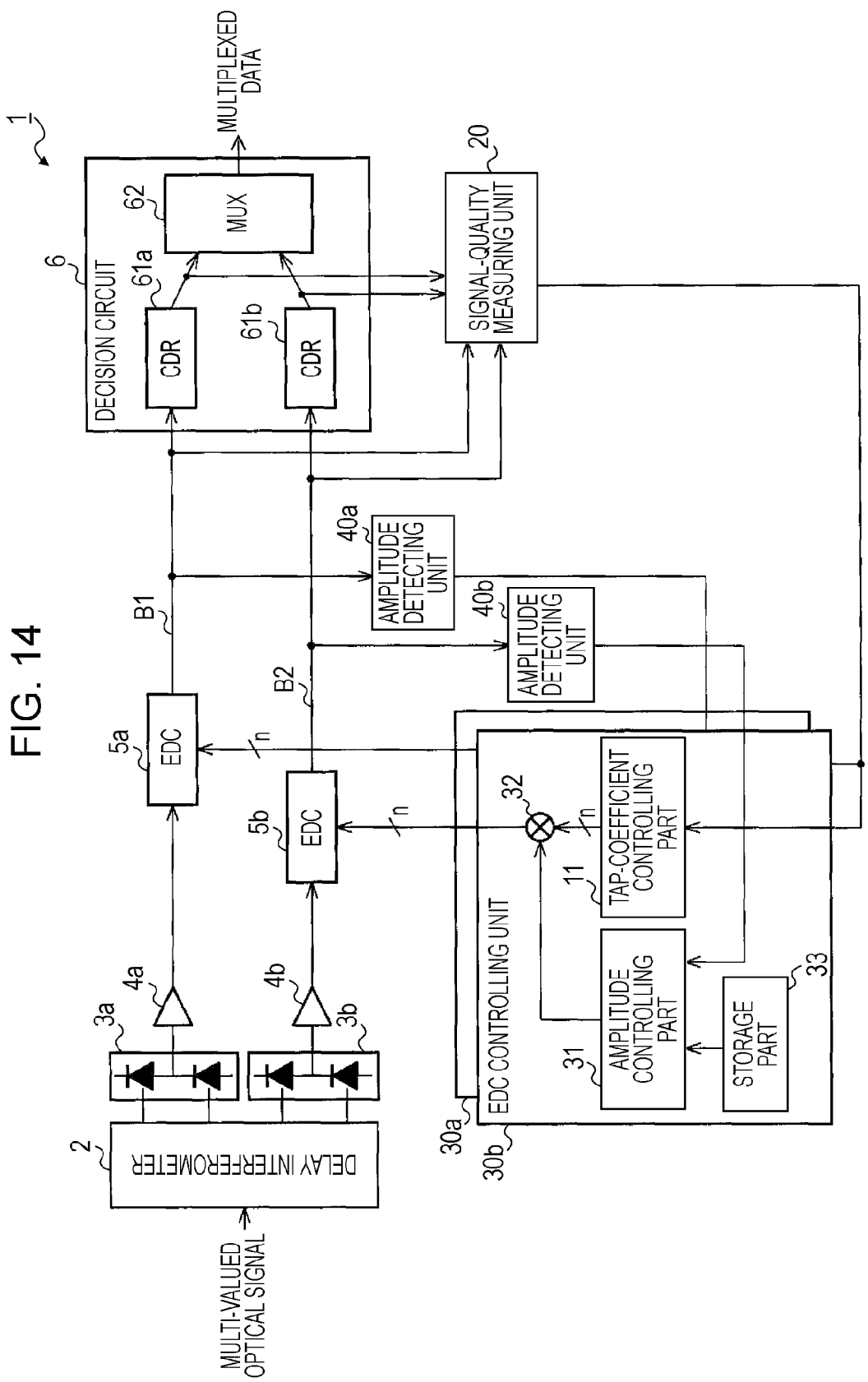

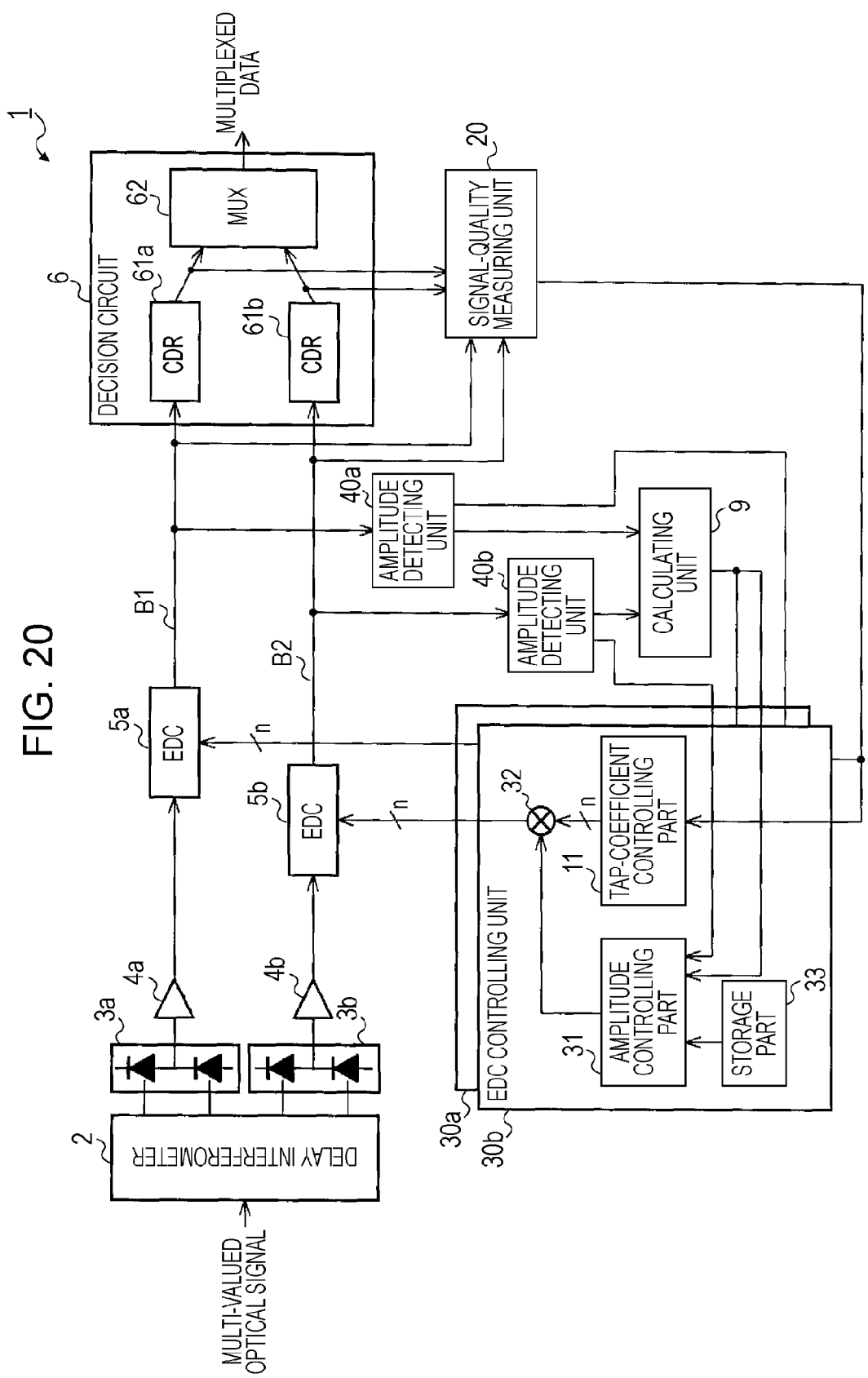

APPARATUS AND METHOD OF CONTROLLING TAP COEFFICIENT OF TRANSVERSAL FILER, OPTICAL RECEIVER APPARATUS, AND OPTICAL COMMUNICATION SYSTEM

CROSS-REFERENCE TO RELATED APPLICATIONS

This application is based upon and claims the benefit of priority of the prior Japanese Patent Application No. 2008-056557, filed on Mar. 6, 2008, the entire contents of which are incorporated herein by reference.

BACKGROUND

1. Field

The embodiments discussed herein are related to control of a tap coefficient of a transversal filter used in an electronic dispersion compensator. More particularly, the embodiments herein are related to control of a tap coefficient of a transversal filter performing waveform equalization of an electrical signal demodulated in an optical receiver apparatus.

2. Description of the Related Art

Research concerning differential quadrature phase shift keying (hereinafter referred to as "DQPSK") is actively carried out in recent years. The DQPSK is used as a communication method for improving the efficiency of usage of the frequency in an optical transmission system. Compensation for such dispersions is performed in an optical communication system since waveform degradation occurs because of chromatic dispersion and/or polarization mode dispersion of optical parts, such as an optical fiber and an optical amplifier Japanese Unexamined Patent Application Publication No. 2007-325095 discloses a transmission system using an electronic dispersion compensator to perform dispersion compensation of a reception signal modulated by the DQPSK method.

It is necessary to adjust the settings of the tap coefficients as soon as possible if the current settings of tap coefficients become inappropriate for the current situations because of a change in the situations, for example, a change in the characteristics of transmission lines and/or transmitter-receiver apparatuses. With the increasing bit rates of optical communication systems, it is required to improve the responsiveness of adaptive control of the tap coefficients to the change in situations and to reduce the range in which the inappropriate settings of the tap coefficients affect data as much as possible.

Furthermore, automatically performing variable control of the tap coefficients of transversal filters can cause the amplitudes of signals output from the transversal filters to exceed the input rating ranges of downstream elements.

An apparatus and a method of the present invention are provided to resolve the problems involved in the variable control of the tap coefficients of a transversal filter provided in an electronic dispersion compensator in an optical receiver apparatus performing waveform equalization of a reception signal by using the electronic dispersion compensator.

SUMMARY

According to an aspect of the invention, an apparatus is provided for controlling a tap coefficient of a transversal filter, the apparatus including an oscillator circuit configured to generate a certain oscillation signal, an adder configured to add the oscillation signal to the tap coefficient of any of one or more taps of the transversal filter, a signal-quality measurer configured to measure a signal quality of a signal output from the transversal filter, and a tap-coefficient adjuster configured to control the value of the tap coefficient so that an optimal amount of shift in the signal quality of the output signal is achieved when the oscillation signal is added to the tap coefficient.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 14 illustrates an example of the configuration of an optical receiver apparatus according to a third embodiment;

FIG. 20 illustrates an example of the configuration of an optical receiver apparatus according to a seventh embodiment.

DETAILED DESCRIPTION OF THE PREFERRED EMBODIMENTS

Figure 1:
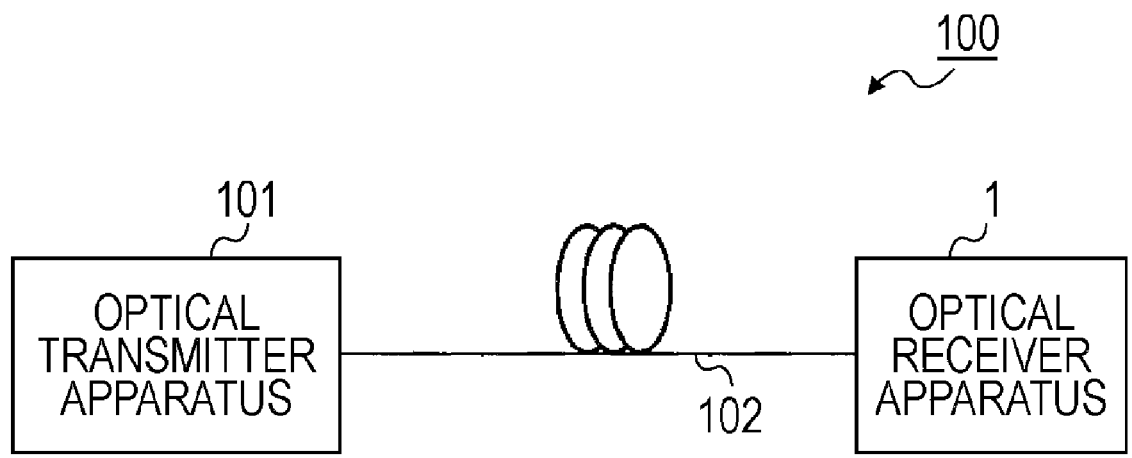
FIG. 1 illustrates an example of the entire configuration of an optical communication system according to an embodiment.

Reference may now be made in detail to embodiments of the present invention, examples of which are illustrated in the accompanying drawings, wherein like reference numerals refer to like elements throughout.

Embodiments of the present invention will herein be described with reference to the attached drawings. FIG. 1 illustrates an example of the entire configuration of an optical communication system according to an embodiment. Referring to FIG. 1, an optical communication system 100 includes an optical transmitter apparatus 101, an optical transmission line 102, and an optical receiver apparatus 1. The optical transmitter apparatus 101 modulates a signal to be transmitted into a multi-valued optical signal and transmits the modulated multi-valued optical signal through the optical transmission line 102. The optical receiver apparatus 1 receives the modulated multi-valued optical signal transmitted through the optical transmission line 102.

Figure 2:
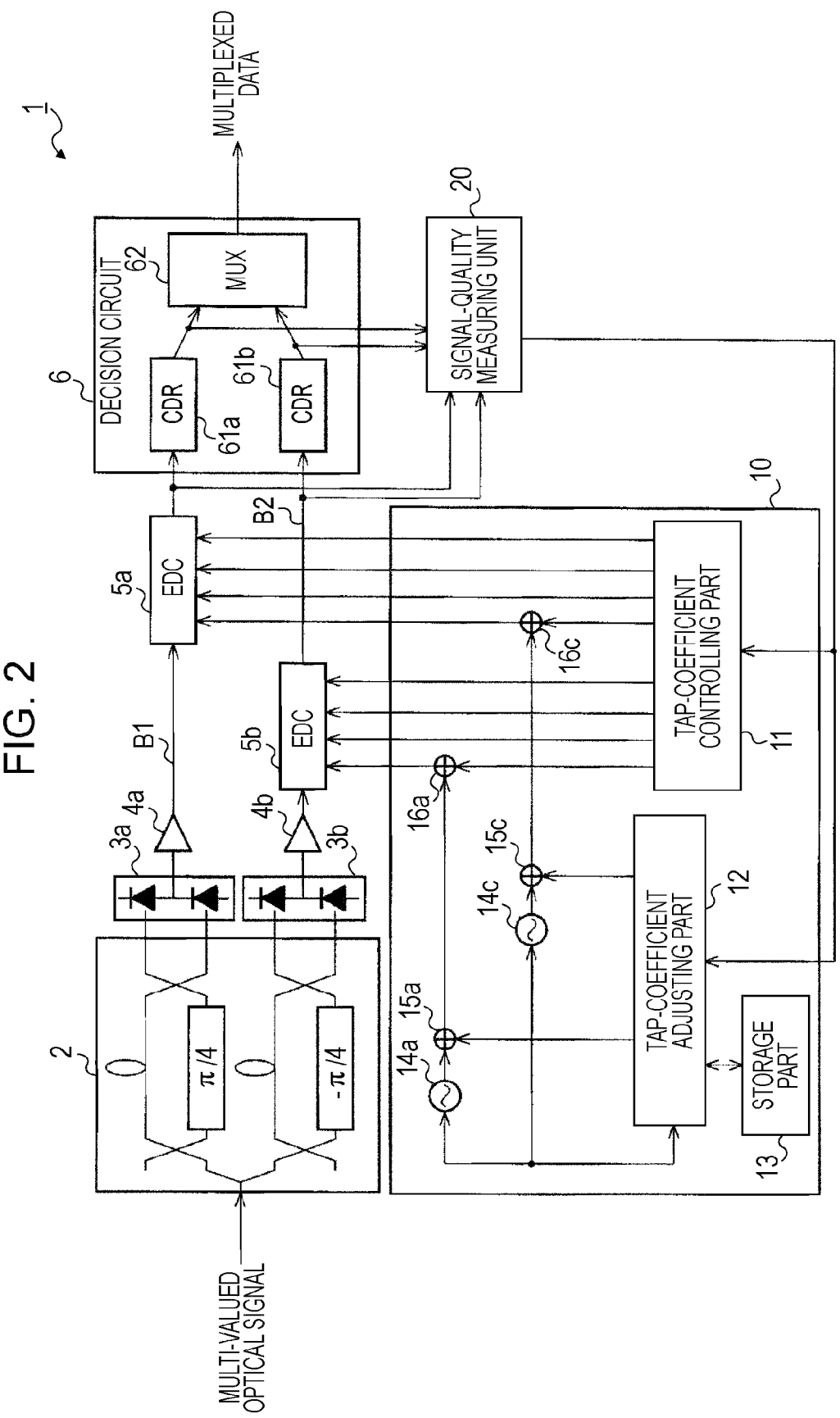
FIG. 2 illustrates an example of the configuration of an optical receiver apparatus according to a first embodiment.

FIG. 2 illustrates an example of the configuration of the optical receiver apparatus according to a first embodiment. It is assumed that the optical receiver apparatus 1 demodulates an optical signal modulated by the DQPSK modulation method in the following description. However, the optical receiver apparatus according to the first embodiment may demodulate an optical signal modulated by a differential multiple-phase shift keying modulation method using multiple phases of a number other than four, instead of the DQPSK modulation method. Furthermore, the optical receiver apparatus according to the first embodiment may demodulate an optical signal modulated by a multi-value modulation method other than the differential multiple-phase shift keying modulation method to perform dispersion compensation and/or waveform equalization.

Referring to FIG. 2, the optical receiver apparatus 1 includes a delay interferometer 2, balanced diodes 3a and 3b, and amplifiers 4a and 4b. The balanced diode 3a converts an optical signal output from the delay interferometer 2 into an electrical signal that is output to a branch B1. The balanced diode 3b converts an optical signal output from the delay interferometer 2 into an electrical signal that is output to a branch B2. The optical receiver apparatus 1 also includes electronic dispersion compensators (EDCs) 5a and 5b and a decision circuit 6. The EDCs 5a and 5b receive the signals supplied from the balanced diodes 3a and 3b through the amplifiers 4a and 4b, respectively, to perform the waveform equalization to the output signals and to compensate the chromatic dispersion included in the input signals. The decision circuit 6 converts the signals output from the EDCs 5a and 5b into digital data. The decision circuit 6 includes a clock-and-data recovery (CDR) circuit 61a that converts the signal output from the EDC 5a into a binary signal, a CDR circuit 61b that converts the signal output from the EDC 5b into a binary signal, and a multiplexer (MUX) circuit 62 that multiplexes the signals supplied from the CDR circuits 61a and 61b.

The EDCs 5a and 5b each include a transversal filter including multiple tap terminals. The optical receiver apparatus 1 further includes a tap-coefficient determining unit 10 that determines the tap coefficients of the tap terminals of the EDCs 5a and 5b. The optical receiver apparatus 1 further includes a signal-quality measurer 20 that measures the signal qualities of the signals output from the EDCs 5a and 5b.

The signal-quality measurer 20 may adopt various indexes as the signal quality of the signal output from each of the EDCs 5a and 5b. For example, the signal-quality measurer 20 may detect an error correcting code included in a digital signal played back by each of the CDR circuits 61a and 61b to calculate a bit error rate (BER) as the signal quality.

The signal-quality measurer 20 may measure an eye aperture ratio of an analog signal output from each of the EDCs 5a and 5b by using an eye monitor to use the eye aperture ratio as the signal quality. The signal-quality measurer 20 may detect a frequency spectrum of an analog signal output from each of the EDCs 5a and 5b and may measure the difference between a predetermined frequency range corresponding to the signal bit rate and the position of the detected frequency spectrum to use the difference as the signal quality. The signal-quality measurer 20 may use an equalization error calculated using training data or an equalization error calculated as the difference between user data and decoded data as the signal quality. The signal-quality measurer 20 may measure the signal qualities of multiple types and may output the measured signal qualities.

The tap-coefficient determining unit 10 includes a tap-coefficient controlling part 11, a tap-coefficient adjusting part 12, a storage part 13, oscillator circuits 14a and 14c, and adders 15a, 15c, 16a, and 16c.

The tap-coefficient controlling part 11 controls the tap coefficients of the EDCs 5a and 5b at startup of the optical receiver apparatus 1 and/or at predetermined first adjustment intervals so that an optimal quality of the signal output from the signal-quality measurer 20 is achieved under temporary transmission conditions including the chromatic dispersion and the polarization mode dispersion at that time.

The tap-coefficient adjusting part 12 adjusts the tap coefficient of any of the tap terminals of the EDC 5a and the tap coefficient of any of the tap terminals of the EDC 5b at second adjustment intervals shorter than the predetermined first adjustment intervals or constantly. The tap-coefficient adjusting part 12 outputs a compensation signal used for compensating each of the tap coefficients controlled by the tap-coefficient controlling part 11. The compensation signal is added to the tap coefficients controlled by the tap-coefficient controlling part 11 under the above temporary transmission conditions by the adders 16a and 16c. Accordingly, the tap-coefficient adjusting part 12 adjusts the tap coefficients of the EDCs 5a and 5b in accordance with a change in the state after the tap-coefficient controlling part 11 controls the tap coefficients. The storage part 13 is used to store the values of the compensation signals output from the tap-coefficient adjusting part 12.

The oscillator circuit 14a generates an oscillation signal to be added to the tap coefficient of the EDC 5b adjusted by the tap-coefficient adjusting part 12, and the adder 15a adds the generated oscillation signal to the compensation signal output from the tap-coefficient adjusting part 12.

The oscillator circuit 14c generates an oscillation signal to be added to the tap coefficient of the EDC 5a adjusted by the tap-coefficient adjusting part 12. The adder 15c adds the generated oscillation signal to the compensation signal output from the tap-coefficient adjusting part 12.

The oscillator circuits 14a and 14c each generate a periodic signal having a predetermined amplitude. The periodic signal may be, for example, a sine wave, a square wave, or a saw tooth wave, as the oscillation signal.

The tap-coefficient adjusting part 12 controls the oscillator circuits 14a and 14c at the second adjusting intervals or constantly so that the oscillation signals are added to the tap coefficients of the EDCs 5b and 5a. The tap-coefficient adjusting part 12 controls the values of the tap coefficients so that the optimal amount of shift in the signal quality measured by the signal-quality measurer 20 is achieved when the oscillation signals are added to the tap coefficients.

The signal-quality measurer 20 supplies a signal-quality instruction signal indicating the signal quality to the tap-coefficient controlling part 11 and the tap-coefficient adjusting part 12. The signal-quality measurer 20 may supply the same signal-quality instruction signal to the tap-coefficient controlling part 11 and the tap-coefficient adjusting part 12. The signal-quality measurer 20 may supply signal-quality instruction signals of different types or signal-quality instruction signals determined by different determination methods to the tap-coefficient controlling part 11 and the tap-coefficient adjusting part 12.

Although the EDCs 5a and 5b each include four tap terminals in the example of the configuration of the optical receiver apparatus 1 in FIG. 2, the number of the tap terminals of each EDC is not restricted to four. The tap-coefficient determining unit 10 may be used for the control of the EDCs each including tap terminals of a number other than four.

Although the tap-coefficient adjusting part 12 adjusts the tap coefficient (a first tap coefficient) of one tap terminal of each of the EDCs 5a and 5b in the example of the configuration of the optical receiver apparatus 1 in FIG. 2, the tap-coefficient adjusting part 12 may adjust the tap coefficients of multiple tap terminals of each of the EDCs 5a and 5b.

Alternatively, the tap-coefficient adjusting part 12 may adjust one or both of the tap coefficients of the tap terminals on both ends, that is, one or both of the tap coefficient added to the signal having the lowest delay and the tap coefficient added to the signal having the highest delay.

The same applies to the other embodiments.

Figure 3:
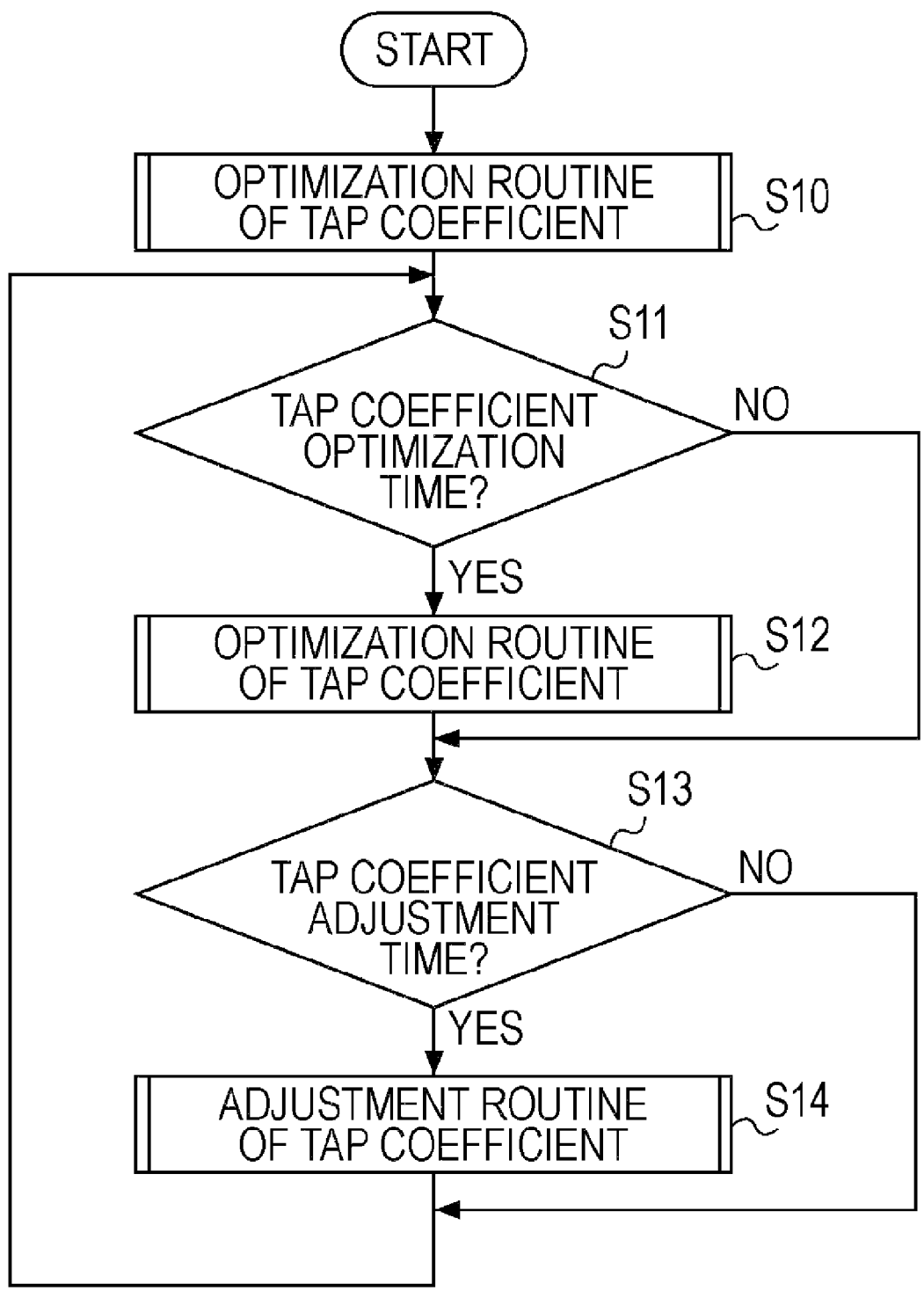
FIG. 3 illustrates an example of a method of controlling tap coefficients according to the first embodiment.

FIG. 3 illustrates an example of a method of controlling the tap coefficients according to the first embodiment. Referring to FIG. 3, at startup of the optical receiver apparatus 1, in Operation S10, the tap-coefficient controlling part 11 controls the tap coefficient of each of the EDCs 5a and 5b so that the optimal quality of the signal output from the signal-quality measurer 20 is achieved under the temporary transmission conditions including the chromatic dispersion and the polarization mode dispersion at that time.

Figure 4:
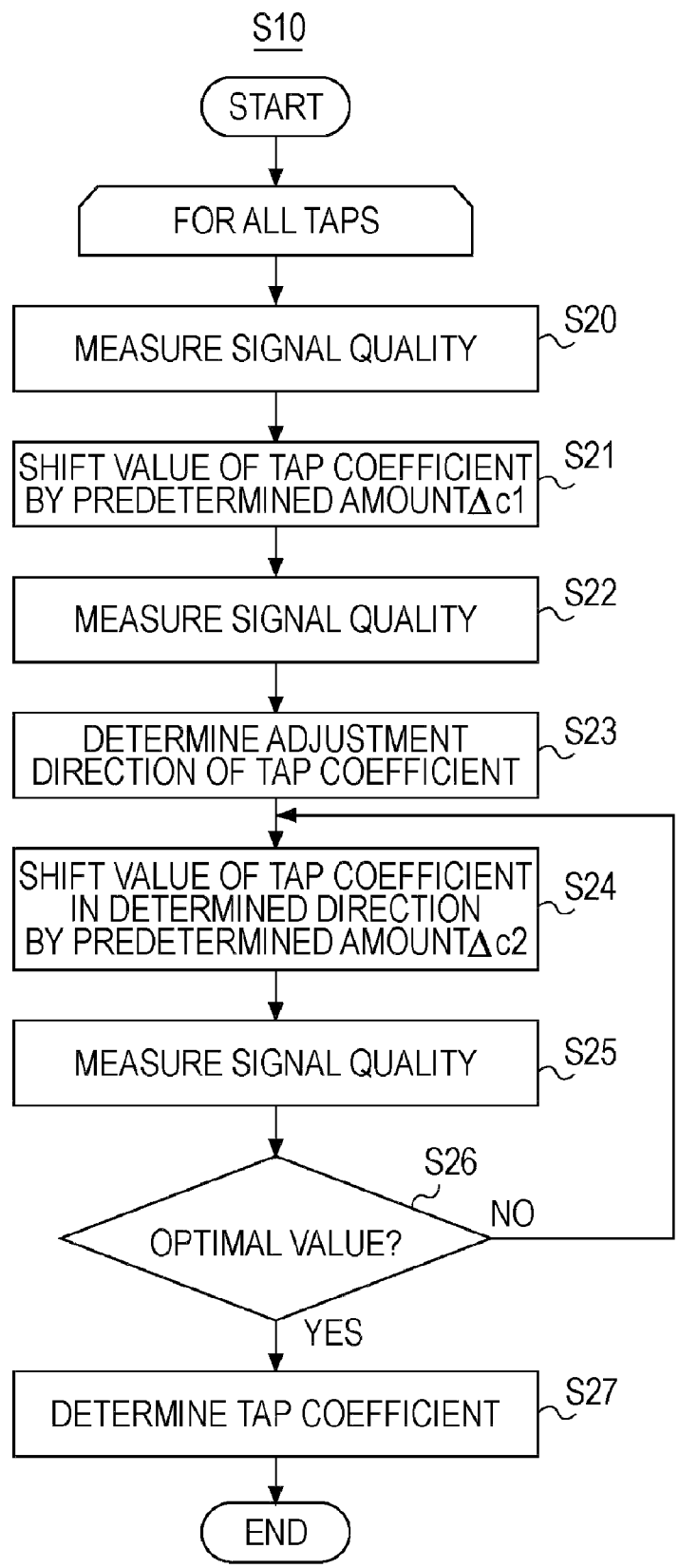
FIG. 4 illustrates an example of an optimization routine of the tap coefficients illustrated in FIG. 3.

Various adaptation algorithms may be used by the tap-coefficient controlling part 11 to control the tap coefficients. FIG. 4 illustrates an example of the optimization routine of the tap coefficients illustrated in Operation S10 in FIG. 3 in detail.

Referring to FIG. 4, in Operation S20, the signal-quality measurer 20 measures the signal quality of the signal output from each of the EDCs 5a and 5b. Although the signal-quality measurer 20 measures the BER as the signal quality in the following description, the signal-quality measurer 20 may measure various indexes including the indexes described above as the signal quality.

In Operation S21, the tap-coefficient controlling part 11 shifts the value of the target tap coefficient to be controlled by a predetermined amount $\Delta c1$. In Operation S22, the signal-quality measurer 20 measures the BER again. Although the signal-quality measurer 20 is arranged downstream of the CDR circuits 61a and 61b in FIG. 2, the signal-quality measurer 20 may be arranged downstream of the MUX circuit 62. In this case, the signal-quality measurer 20 may measure the information output from the MUX circuit 62 to measure the signal quality.

In Operation S23, the tap-coefficient controlling part 11 compares the BER measured in Operation S20 with the BER measured in Operation S22 to determine whether the target tap coefficient is to be adjusted to the positive direction or the negative direction. For example, if the BER is improved by the shift in Operation S21, the target tap coefficient is adjusted in the same direction as in the shift in Operation S21. If the BER is degraded by the shift in Operation S21, the target tap coefficient is adjusted in the direction opposite to the shift direction in Operation S21.

In Operation S24, the tap-coefficient controlling part 11 shifts the value of the tap coefficient in the adjustment direction determined in Operation S23 by a predetermined amount $\Delta c2$. In Operation S25, the signal-quality measurer 20 measures the BER again. Operations S24 and S25 are repeated until the tap-coefficient controlling part 11 determines in Operation S26 that the BER reaches the optimal value. However, Operation S23 may be appropriately performed to determine the direction in which the value of the tap coefficient is shifted during the repetition of Operations S24 and S25.

In Operation S26, the tap-coefficient controlling part 11 determines whether the BER reaches the optimal value. For example, the tap-coefficient controlling part 11 may determine that the BER reaches the optimal value if the difference between the BERs that are continuously measured in the repetition loop of Operations S24 and S25 is lower than a predetermined value. If the tap-coefficient controlling part 11 determines that the BER reaches the optimal value, the process goes to Operation S27.

In Operation S27, the tap-coefficient controlling part 11 determines the tap coefficient when the BER reaches the optimal value to be the tap coefficient that is used. Then, the optimization routine of the tap coefficients illustrated in FIG. 4 is terminated. Operations S20 to S27 are performed to all the tap coefficients of the EDCs 5a and 5b.

The optimization routine illustrated in FIG. 4 is only an example and various adaptation algorithms may be used to converge the signal quality into the optimal value. The signal-quality measurer 20 may use an equalization error signal as the signal-quality instruction signal to use a least mean square (LMS) algorithm or a recursive least squares (RLS) algorithm.

Referring back to FIG. 3, in Operations S11 and S12, the tap-coefficient controlling part 11 controls the tap coefficient in the same manner as in Operation S10 at the predetermined first adjustment intervals. Specifically, in Operation S11, the tap-coefficient controlling part 11 determines whether the predetermined first adjustment time elapsed since the previous control. If the tap-coefficient controlling part 11 determines that the predetermined first adjustment time elapsed since the previous control, then in Operation S12, the tap-coefficient controlling part 11 performs the optimization routine of the tap coefficient in the same manner as in Operation S10. If the tap-coefficient controlling part 11 determines in Operation S11 that the predetermined first adjustment time does not elapse since the previous control, the process skips Operation S12 to go to Operation S13.

In Operation S13, the tap-coefficient adjusting part 12 determines whether it is time to adjust the first tap coefficient of each of the EDCs 5a and 5b. For example, the adjustment time interval used by the tap-coefficient adjusting part 12 may be set to the second adjustment time shorter than the first adjustment time used by the tap-coefficient controlling part 11, and the tap-coefficient adjusting part 12 may determine whether the second adjustment time elapsed since the previous adjustment. Alternatively, the determination in Operation S13 may be skipped and the tap-coefficient controlling part 11 may constantly adjust the first tap coefficient of each of the EDCs 5a and 5b. If the tap-coefficient adjusting part 12 determines that it is time to adjust the first tap coefficient of each of the EDCs 5a and 5b, the process goes to Operation S14. If the tap-coefficient adjusting part 12 determines that it is not time to adjust the first tap coefficient of each of the EDCs 5a and 5b, the process skips Operation S14 to go back to Operation S11.

In Operation S14, the tap-coefficient adjusting part 12 controls the value of each of the tap coefficients so that the optimal amount of shift in the signal quality measured by the signal-quality measurer 20 is achieved when the oscillation signals generated by the oscillator circuits 14a and 14c are added to the first tap coefficients of the EDCs 5b and 5a, respectively. Accordingly, the tap-coefficient adjusting part 12 adjusts the tap coefficient of each of the EDCs 5a and 5b in accordance with a change in the state after the tap-coefficient controlling part 11 controls the tap coefficients. Then, the process goes back to Operation S11.

Figure 5:
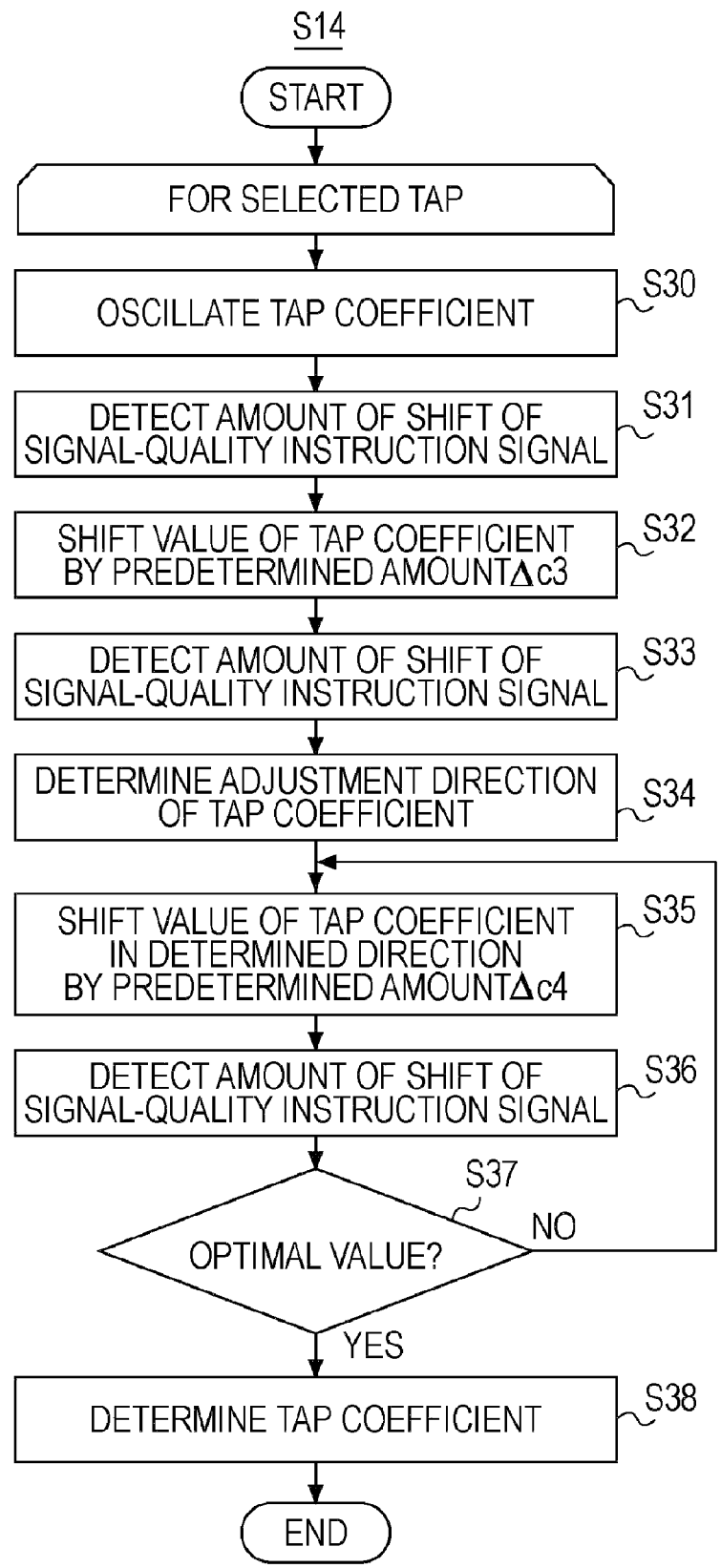
FIG. 5 illustrates an example of an adjustment routine of the tap coefficients illustrated in FIG. 3.

Various adaptation algorithms may be used by the tap-coefficient adjusting part 12 to adjust the tap coefficients. FIG. 5 illustrates an example of the adjustment routine of the tap coefficients illustrated in Operation S14 in FIG. 3 in detail.

Referring to FIG. 5, in Operation S30, the tap-coefficient adjusting part 12 instructs the oscillator circuits 14a and 14c to generate oscillation signals. The oscillation signal generated by the oscillator circuit 14a is added to the first tap coefficient of the EDC 5b through the adders 15a and 16a to oscillate the first tap coefficient of the EDC 5b. The oscillation signal generated by the oscillator circuit 14c is added to the first tap coefficient of the EDC 5a through the adders 15c and 16c to oscillate the first tap coefficient of the EDC 5a.

The frequencies of the oscillation signals generated by the oscillator circuits 14a and 14c are desirably in a lower level, compared with the bit rates of the signals output from the EDCs 5b and 5a, in consideration of the characteristics, size, and cost of the circuits.

A forward error correction (FEC) circuit, which may be arranged downstream of the CDR circuits 61a and 61b, has a feature in that a minor shift in the bit error rate of its input signal does not have a large effect on the bit error rate of its output signal. Accordingly, the addition of a minor oscillation signal to the tap coefficient hardly degrades the reception performance of the optical receiver apparatus.

Furthermore, the oscillation period of the oscillation signal generated by each of the oscillator circuits 14a and 14c may be shorter than one period of a subframe including the error correcting code in the signal output from each of the EDCs 5b and 5a. In this case, since the effect of the addition of the oscillation signal is averaged over one period of the subframe including the error correcting code, it is possible to further reduce the degradation in the reception performance of the optical receiver apparatus 1 caused by the addition of the oscillation signals.

The same applies to the other embodiments.

In Operation S31, the signal-quality measurer 20 measures the signal quality, for example, the BER of the signal output from each of the EDCs 5a and 5b while the first tap coefficient is oscillating. The tap-coefficient adjusting part 12 detects the amount of shift in the BER over the oscillation period of the first tap coefficient.

In Operation S32, the tap-coefficient adjusting part 12 shifts the compensation signal used for compensating the first tap coefficient of each of the EDCs 5a and 5b by a predetermined amount Δc3 to shift the value of the tap coefficient by the predetermined amount Δc3. In Operation S33, the tap-coefficient adjusting part 12 detects the amount of shift in the BER, as in Operation S31.

In Operation S34, the tap-coefficient adjusting part 12 compares the amount of shift in the BER detected in Operation S31 with the amount of shift in the BER detected in Operation S33 to determine whether the value of the first tap coefficient of each of the EDCs 5a and 5b is adjusted to the positive direction or to the negative direction.

Figure 6:
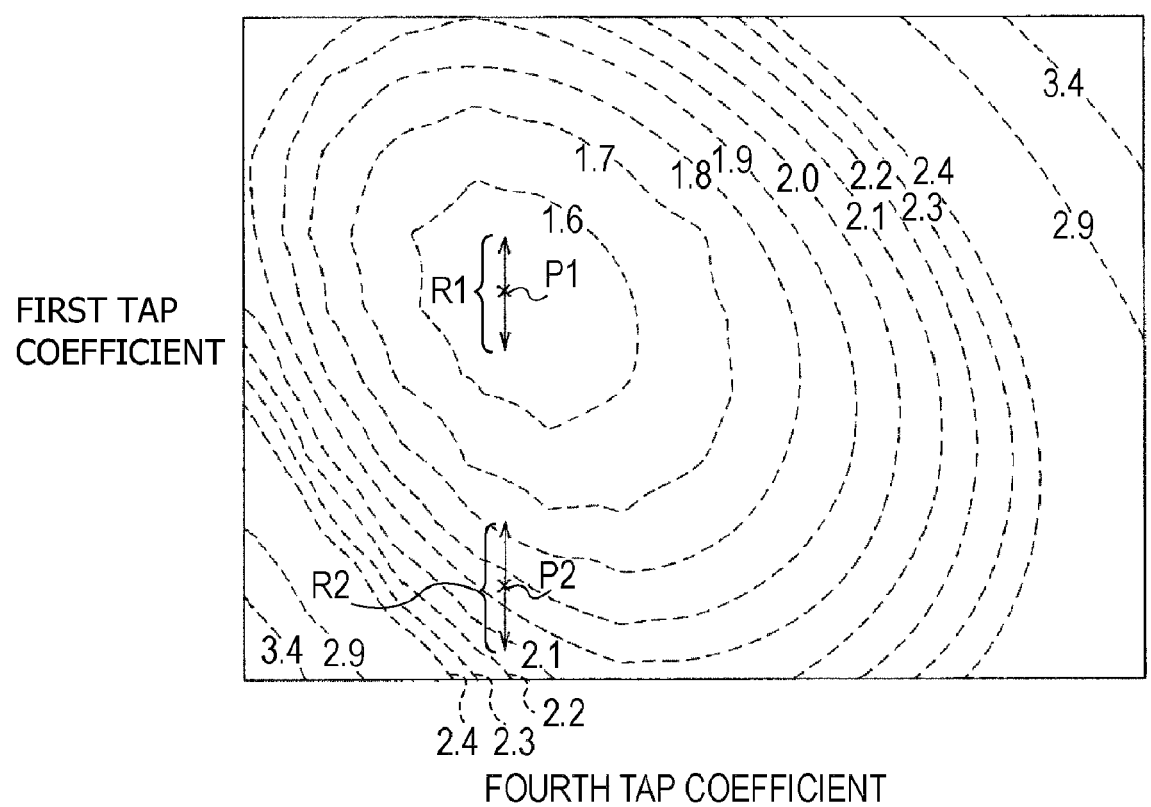
FIG. 6 is used to describe the adjustment routine of the tap coefficients illustrated in FIG. 5.

FIG. 6 is used to describe the adjustment routine of the tap coefficients illustrated in FIG. 5. FIG. 6 illustrates an example of the result of simulation of the shift in the BER when the first and fourth tap coefficients are shifted in the EDC including four tap terminals. Each boundary represented by a broken line indicates the value of the BER corresponding to each value of the first and fourth tap coefficients. The values of the BERs illustrated in FIG. 6 represent the relative values (dB) with respect to a predetermined BER value.

As apparent from FIG. 6, the shift ratio of the BER relative to the shifts of the tap coefficients is low around an optimal point P1 having a lower BER, that is having the highest signal quality while the shift ratio of the BER relative to the shifts of the tap coefficients is high around a point P2 away from the optimal point. Accordingly, the amount of shift in the BER when the tap coefficients are oscillated around the optimal point P1 within a predetermined range R1 is smaller than the amount of shift in the BER when the tap coefficients are oscillated around the point P2 away from the optimal point P1 within a predetermined range R2. As described above, the amount of shift in the BER appearing when the oscillation signals are added to the tap coefficients to oscillate the tap coefficients, that is, the amount of shift in the signal quality may be used as an index indicating the distance between the current value and the optimal value of each tap coefficient. The control of the tap coefficients using such an index allows the tap coefficients to be rapidly converged into the optimal value.

Accordingly, if the shift ratio of the BER is reduced as the result of the shift in Operation S32, the value of the first tap coefficient is adjusted in the same direction as the shift direction in Operation S32. If the shift ratio of the BER is increased as the result of the shift in Operation S32, the value of the first tap coefficient is adjusted in the direction opposite to the shift direction in Operation S32.

Referring back to FIG. 5, in Operation S35, the tap-coefficient adjusting part 12 shifts the compensation signal used for compensating the first tap coefficient of each of the EDCs 5a and 5b in the direction determined in Operation S34 by a predetermined amount Δc4 to shift the first tap coefficient by the predetermined amount Δc4. In Operation S36, the tap-coefficient adjusting part 12 detects the amount of shift in the BER again. Operations S35 and S36 are repeated until the tap-coefficient adjusting part 12 determines in Operation S37 that the amount of shift in the BER reaches the optimal value.

In Operation S37, the tap-coefficient adjusting part 12 determines whether the amount of shift in the BER reaches the optimal value. For example, the tap-coefficient adjusting part 12 may determine that the amount of shift in the BER reaches the optimal value if the difference between the amounts of shift in the BER, which are continuously detected in the repetition loop of Operations S35 and S36, is lower than a predetermined value. If the tap-coefficient adjusting part 12 determines in Operation S37 that the amount of shift in the BER reaches the optimal value, the process goes to Operation S38.

In Operation S38, the tap-coefficient adjusting part 12 stores the compensation signal used for compensating each first tap coefficient when the amount of shift in the BER reaches the optimal value in the storage part 13, and subsequently uses the stored compensation signal to compensate the first tap coefficient. Then, the adjustment routine of the tap coefficients is terminated. The tap-coefficient adjusting part 12 instructs the oscillator circuits 14a and 14b to stop the generation of the oscillation signals.

When the adjustment is performed to multiple tap terminals of one EDC, Operations S30 to S38 are repeated for every tap terminal to be adjusted.

The adjustment routine illustrated in FIG. 6 is only an example and various adaptation algorithms may be used to converge the amount of shift in the BER into the optimal value.

Figure 7:
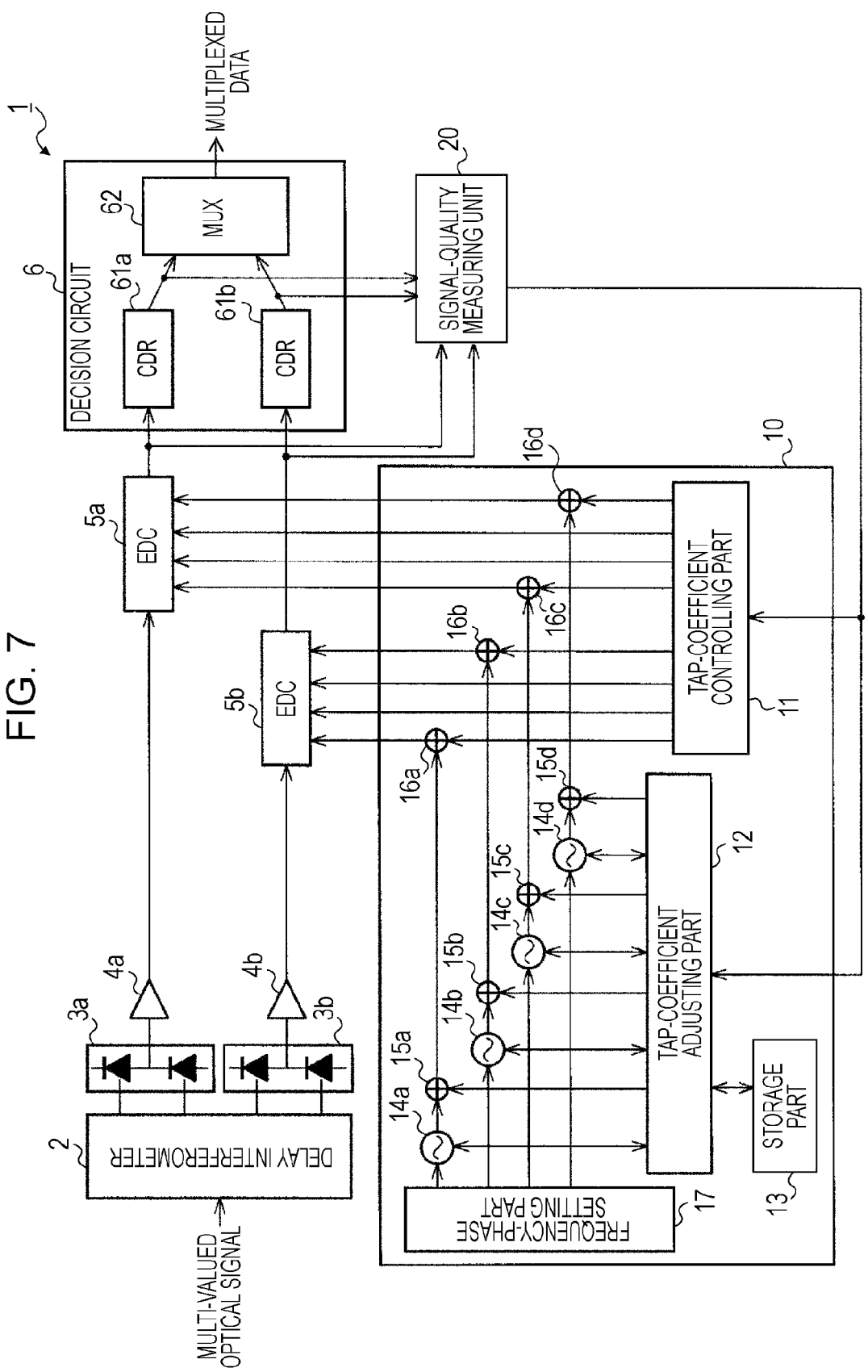
FIG. 7 illustrates an example of the configuration of an optical receiver apparatus according to a second embodiment.

FIG. 7 illustrates an example of the configuration of an optical receiver apparatus according to a second embodiment. The same reference numerals are used in FIG. 7 to identify the same components in the optical receiver apparatus according to the first embodiment illustrated in FIG. 2. A description of the same functions as in the optical receiver apparatus according to the first embodiment is omitted herein.

In the example of the configuration of the optical receiver apparatus 1 in FIG. 7, the multiple tap coefficients are concurrently oscillated in each of the EDCs 5a and 5b. For example, the fourth tap terminal, in addition to the first tap terminal, of each of the EDCs 5a and 5b including the four tap terminals are concurrently oscillated.

In order to realize the above oscillation, the tap-coefficient determining unit 10 includes an oscillator circuit 14b generating an oscillation signal added to the fourth tap coefficient of the EDC 5b, an oscillator circuit 14d generating an oscillation signal added to the fourth tap coefficient of the EDC 5a, and adders 15b, 15d, 16b, and 16d, in addition to the components illustrated in FIG. 2.

The tap-coefficient adjusting part 12 outputs the compensation signals to be added to the fourth tap coefficients of the EDCs 5a and 5b.

The oscillator circuit 14b generates an oscillation signal to be added to the fourth tap coefficient of the EDC 5b adjusted by the tap-coefficient adjusting part 12, and the adder 15b adds the generated oscillation signal to the compensation signal output from the tap-coefficient adjusting part 12. The compensation signal to which the oscillation signal is added is added to the tap coefficient output from the tap-coefficient controlling part 11 by the adder 16b.

The oscillator circuit 14d generates an oscillation signal to be added to the fourth tap coefficient of the EDC 5a adjusted by the tap-coefficient adjusting part 12, and the adder 15d adds the generated oscillation signal to the compensation signal output from the tap-coefficient adjusting part 12. The compensation signal to which the oscillation signal is added is added to the tap coefficient output from the tap-coefficient controlling part 11 by the adder 16d.

The tap-coefficient adjusting part 12 controls the oscillator circuits 14a to 14d at the second adjusting intervals or constantly so that the oscillation signals are added to the tap coefficients of the EDCs 5b and 5a to control the values of the tap coefficients so that the optimal amount of shift in the signal quality measured by the signal-quality measurer 20 is achieved when the oscillation signals are added to the tap coefficients.

The tap-coefficient determining unit 10 further includes a frequency-phase setting part 17 that controls the oscillator circuits 14a and 14b generating the oscillation signals to be added to the first and fourth tap coefficients of the EDC 5b to set the frequency and/or the phase of the oscillation signals to be added to the first and fourth tap coefficients of the EDC 5b, and that controls the oscillator circuits 14d and 14d generating the oscillation signals to be added to the first and fourth tap coefficients of the EDC 5a to set the frequency and/or the phase of the oscillation signals to be added to the first and fourth tap coefficients of the EDC 5a.

According to the second embodiment, in the concurrent oscillation of the multiple tap coefficients in one EDC, all the tap coefficients to which the oscillation signals are added may be concurrently oscillated or some of the multiple tap coefficients to which the oscillation signals are added may be concurrently oscillated.

Figure 8:
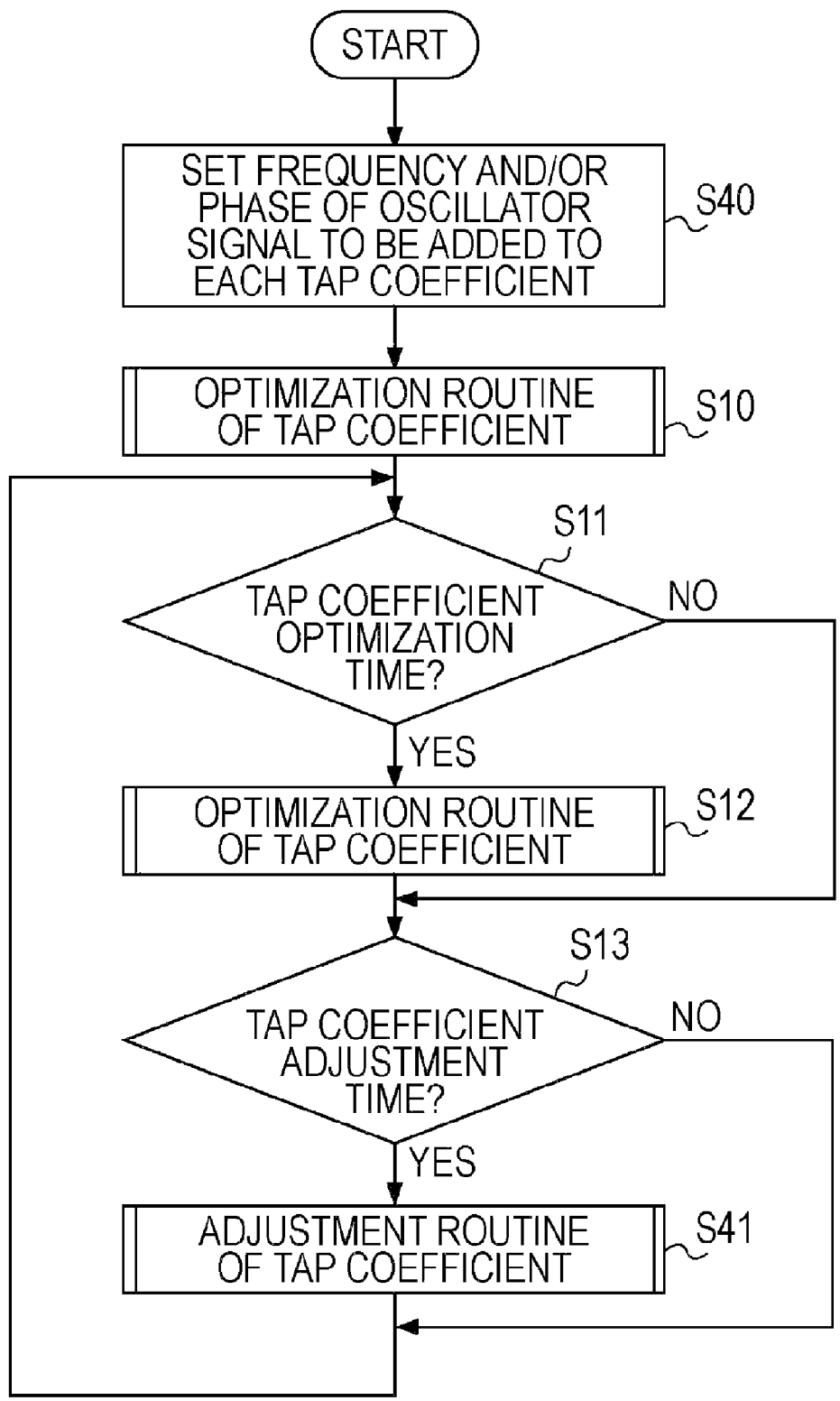
FIG. 8 illustrates an example of a method of controlling the tap coefficients according to the second embodiment.

FIG. 8 illustrates a method of controlling the tap coefficients according to the second embodiment. Referring to FIG. 8, at startup of the optical receiver apparatus 1, in Operation S40, the frequency-phase setting part 17 sets the frequency and/or the phase of the oscillation signals to be added to the first and fourth tap coefficients of the EDC 5a and the frequency and/or the phase of the oscillation signals to be added to the first and fourth tap coefficients of the EDC 5b. An example of the setting of the frequency and/or the phase of the oscillation signals will be described below.

Operations S10 to S13 in FIG. 8 are similar to Operations S10 to S13 in FIG. 3. In Operation S41, the tap-coefficient adjusting part 12 concurrently controls the values of the first and fourth tap coefficients of the EDC 5b and concurrently controls the values of the first and fourth tap coefficients of the EDC 5a so that the optimal amount of shift in the quality of the signal output from the signal-quality measurer 20 is achieved when the oscillation signals generated by the oscillator circuits 14a and 14b are added to the first and fourth tap coefficients of the EDC 5b, respectively, and the oscillation signals generated by the oscillator circuits 14c and 14d are added to the first and fourth tap coefficients of the EDC 5a, respectively. Then, the process goes back to Operation S11.

Figure 9:
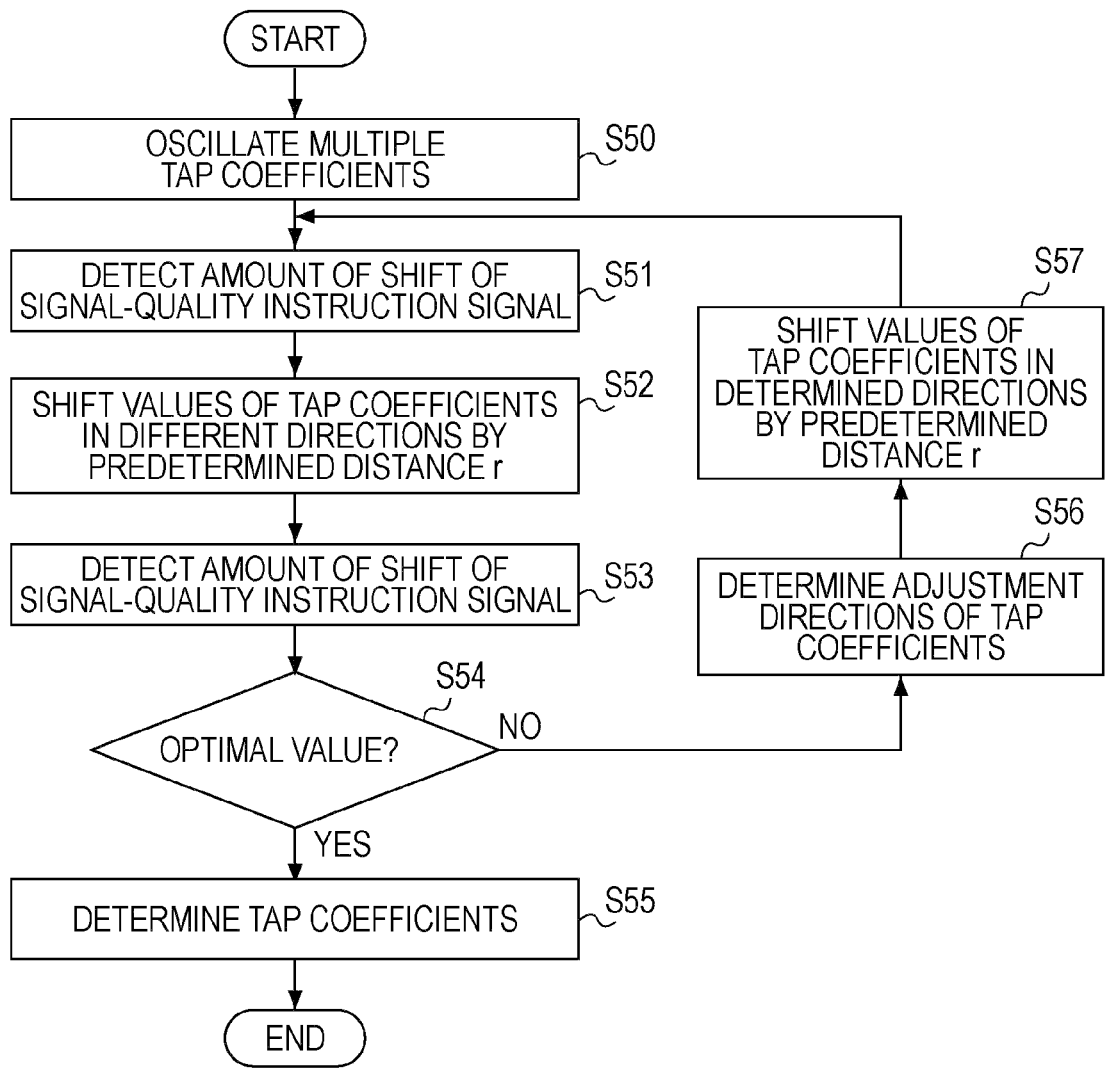
FIG. 9 illustrates an example of an adjustment routine of the tap coefficients illustrated in FIG. 8.

Various adaptation algorithms may be used by the tap-coefficient adjusting part 12 to adjust the tap coefficients. FIG. 9 illustrates an example of the adjustment routine of the tap coefficients illustrated in Operation S41 in FIG. 8 in detail.

Referring to FIG. 9, in Operation S50, the tap-coefficient adjusting part 12 instructs the oscillator circuits 14a to 14d to generate oscillation signals. The oscillation signals generated by the oscillator circuits 14a and 14b are added to the first and fourth tap coefficients of the EDC 5b, respectively, and the oscillation signals generated by the oscillator circuits 14c and 14d are added to the first and fourth tap coefficients of the EDC 5a, respectively, to concurrently oscillate the first and fourth tap coefficients in each of the EDCs 5b and 5a. The frequency and/or the phase of the oscillation signals generated by the oscillator circuits 14a and 14b and the frequency and/or the phase of the oscillation signals generated by the oscillator circuits 14c and 14d are set by the frequency-phase setting part 17 in Operation S40.

In Operation S51, the signal-quality measurer 20 measures the signal quality of the signal output from each of the EDCs 5a and 5b while the first and fourth tap coefficients are oscillating. Although the signal-quality measurer 20 measures the BER as the signal quality in the following description, the signal-quality measurer 20 may measure various indexes including the indexes described above as the signal quality. The tap-coefficient adjusting part 12 detects the amount of shift in the BER over the longer period among the oscillation periods of the first and fourth tap coefficients.

Figure 10:
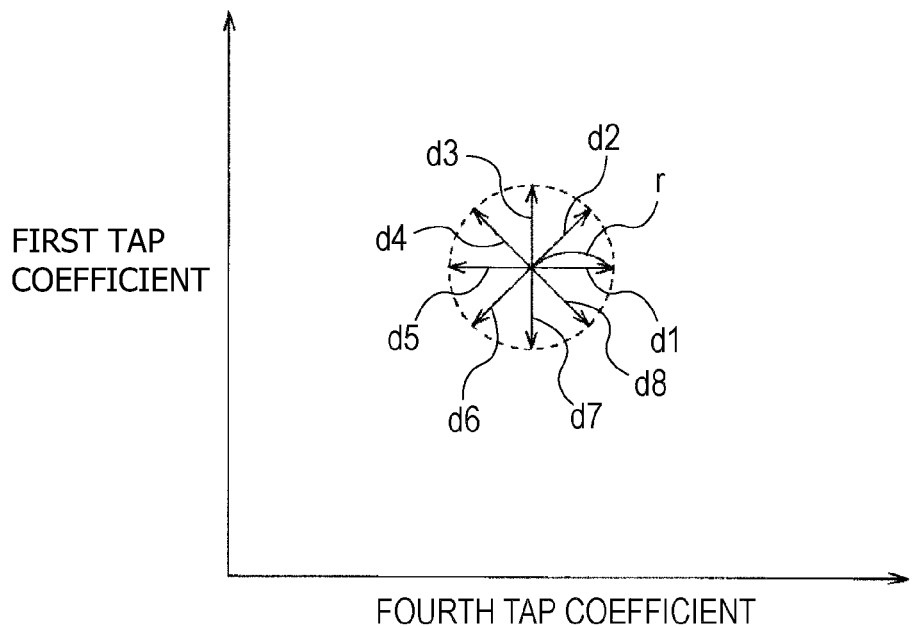
FIG. 10 illustrates the directions in which the tap coefficients are shifted.

In Operation S52, the first and fourth tap coefficients are shifted, for example, in multiple predetermined shift directions d1 to d8 illustrated in FIG. 10 by a predetermined distance r. The shift of the tap coefficients is performed by the tap-coefficient adjusting part 12 that shifts the compensation signals used for compensating the first and fourth tap coefficients of the EDCs 5a and 5b. After the first and fourth tap coefficients are shifted in the shift directions d1 to d8, then in Operation S53, the tap-coefficient adjusting part 12 detects the amount of shift in the BER, as in Operation S51.

The shift of the first and fourth tap coefficients by the predetermined distance r means that the sum of squares of the amount of shift of the first tap coefficient and the amount of shift of the fourth tap coefficient is constant.

Figure 11:
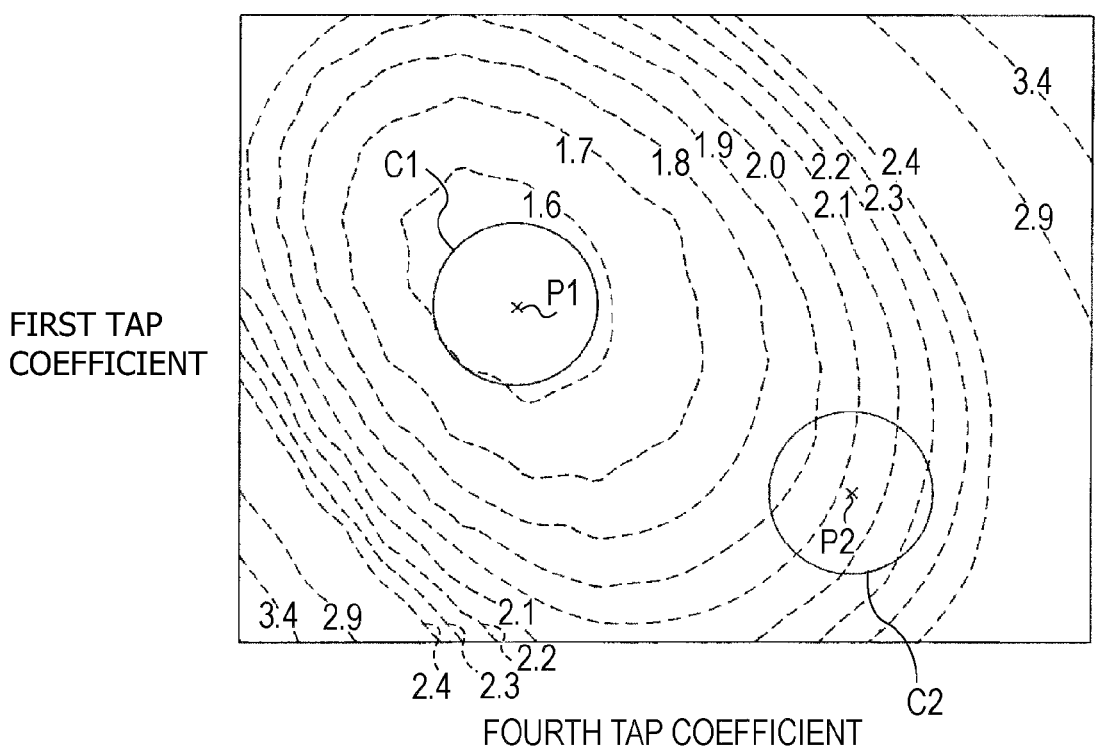
FIG. 11 is used to describe the adjustment routine of the tap coefficients illustrated in FIG. 9.

In Operation S54, the tap-coefficient adjusting part 12 determines whether the amount of shift in the BER reaches the optimal value. FIG. 11 is used to describe the adjustment routine of the tap coefficients illustrated in FIG. 9. FIG. 11 illustrates an example of the result of simulation of the shift in the BER, as in the example in FIG. 6.

Referring to FIG. 11, the coordinates of points P1 and P2 indicate the values of the compensated first and fourth tap coefficients after the tap coefficients output from the tap-coefficient controlling part 11 are compensated by the tap-coefficient adjusting part 12.

A curve C1 represents the trajectory of the first and fourth tap coefficients when the compensated tap coefficient is at the point P1 and both of the first tap coefficient and the fourth tap coefficient that are compensated are oscillated with the oscillation signals. A curve C2 represents the trajectory of the first and fourth tap coefficients when the compensated tap coefficient is at the point P2 and both of the first tap coefficient and the fourth tap coefficient that are compensated are oscillated with the oscillation signals. Since the difference in phase between the oscillation signal added to the first tap coefficient and the oscillation signal added to the fourth tap coefficient is 90° in the example in FIG. 11, the tap coefficients have substantially circular trajectories.

The amount of shift in the BER along the curve C1 is small because the shift ratio of the BER with respect to the shift of the tap coefficients is low around the optimal point P1 having the highest signal quality while the amount of shift in the BER along the curve C2 is large because the shift ratio of the BER with respect to the shift of the tap coefficients is high around the optimal point P2 away from the optimal point P1.

Accordingly, the tap-coefficient adjusting part 12 calculates the difference in the amount of shift in the BER between before and after the tap coefficients are shifted in Operation S52 for each of the shift directions d1 to d8. The tap-coefficient adjusting part 12 determines that the amount of shift in the BER reaches the optimal value if the largest difference in the amount of shift in the BER is lower than a predetermined threshold value. If the tap-coefficient adjusting part 12 determines in Operation S54 that the amount of shift in the BER reaches the optimal value, then in Operation S55, the tap-coefficient adjusting part 12 stores the compensation signals used for compensating the first and fourth tap coefficient when the amount of shift in the BER reaches the optimal value in the storage part 13, and subsequently uses the stored compensation signals to compensate the first and fourth tap coefficients. Then, the adjustment routine of the tap coefficients illustrated in FIG. 9 is terminated. The tap-coefficient adjusting part 12 instructs the oscillator circuits 14a to 14d to stop the generation of the oscillation signals.

If the tap-coefficient adjusting part 12 determines in Operation S54 that the amount of shift in the BER does not reach the optimal value, then in Operation S56, the tap-coefficient adjusting part 12 determines the adjustment directions of the first and fourth tap coefficients. The tap-coefficient adjusting part 12 selects the amount of shift in the BER which is subjected to the largest reduction between before and after the tap coefficients are shifted, among the amounts of shift in the BER calculated for the shift directions d1 to d8. The direction in which the amount of shift in the BER is calculated is determined to be the adjustment direction.

In Operation S57, the tap-coefficient adjusting part 12 shifts the values of the first and fourth tap coefficients in the determined adjustment direction by the predetermined distance r. Then, the process goes back to Operation S51.

The shift ratio of the BER detected along the curve C1 or C2, that is, the shift ratio of the BER detected while both of the first tap coefficient and the fourth tap coefficient are concurrently oscillated to two-dimensionally shift the first and fourth tap coefficients includes information concerning the shift ratio of the BER with respect to the shift in the tap coefficient in the two two-dimensional directions. Accordingly, controlling the shift ratio of the BER so as to achieve the optimal value by using the shirt ratio of the BER detected along the curve C1 or C2 as the index allows both of the first tap coefficient and the fourth tap coefficient to be concurrently adjusted, thereby greatly reducing the control time.

The adjustment routine illustrated in FIG. 9 is only an example and various adaptation algorithms may be used to converge the amount of shift in the BER into the optimal value.

Although the two tap coefficients are concurrently oscillated for each EDC to concurrently adjust the two tap coefficients in the second embodiment, three or more tap coefficients may be concurrently oscillated to concurrently adjust the tap coefficients.

Figure 12A:
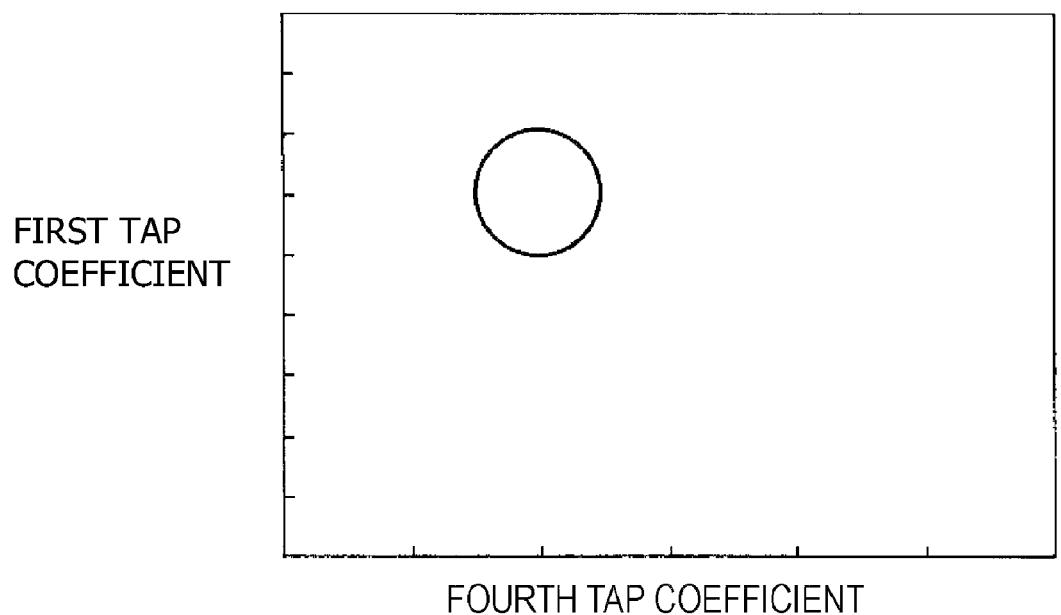
FIG. 12A illustrates an example in which the phases of multiple oscillation signals are set and FIG. 12B illustrates an example in which the frequencies of multiple oscillation signals are set.
Figure 12B:
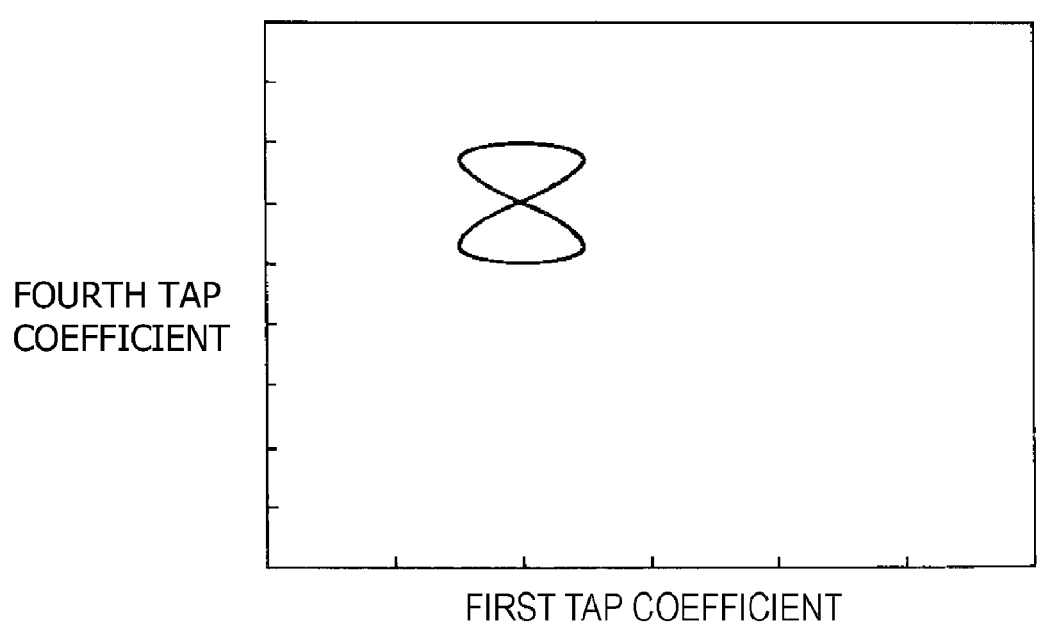

FIG. 12A illustrates an example in which the frequency-phase setting part 17 sets the phases of multiple oscillation signals. FIG. 12B illustrates an example in which the frequency-phase setting part 17 sets the frequencies of multiple oscillation signals. In the example illustrated in FIG. 12A, the phase of the oscillation signal oscillating the first tap coefficient differs from that of the oscillation signal oscillating the fourth tap coefficient by 90°. In the example illustrated in FIG. 12B, the ratio between the frequency of the oscillation signal oscillating the first tap coefficient and the frequency of the oscillation signal oscillating the fourth tap coefficient is set to 2:1.

Differentiating the phase or the frequency between the oscillation signals that are concurrently added to multiple tap coefficients of one EDC allows the distribution range of the trajectory of the tap coefficients to be expanded, so that the amount of shift in more accurate signal-quality instruction information is possibly detected.

Figure 13A:
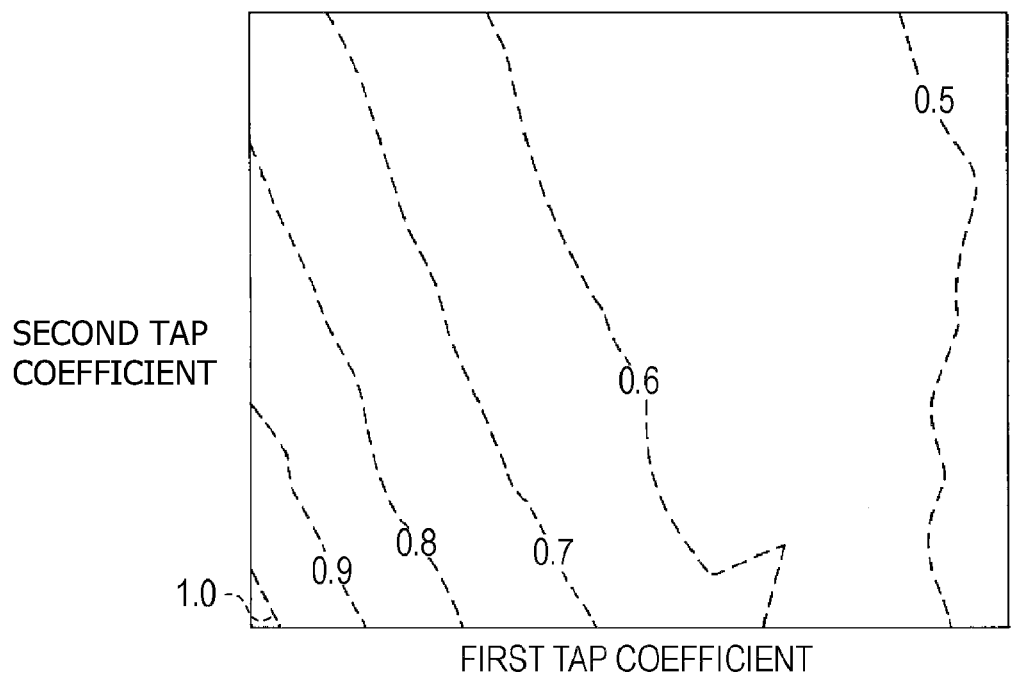
FIG. 13A illustrates an example of the result of simulation of the shift in the signal quality when first and second tap coefficients are shifted and FIG. 13B illustrates an example of the result of simulation of the shift in the signal quality when first and third tap coefficients are shifted.
Figure 13B:
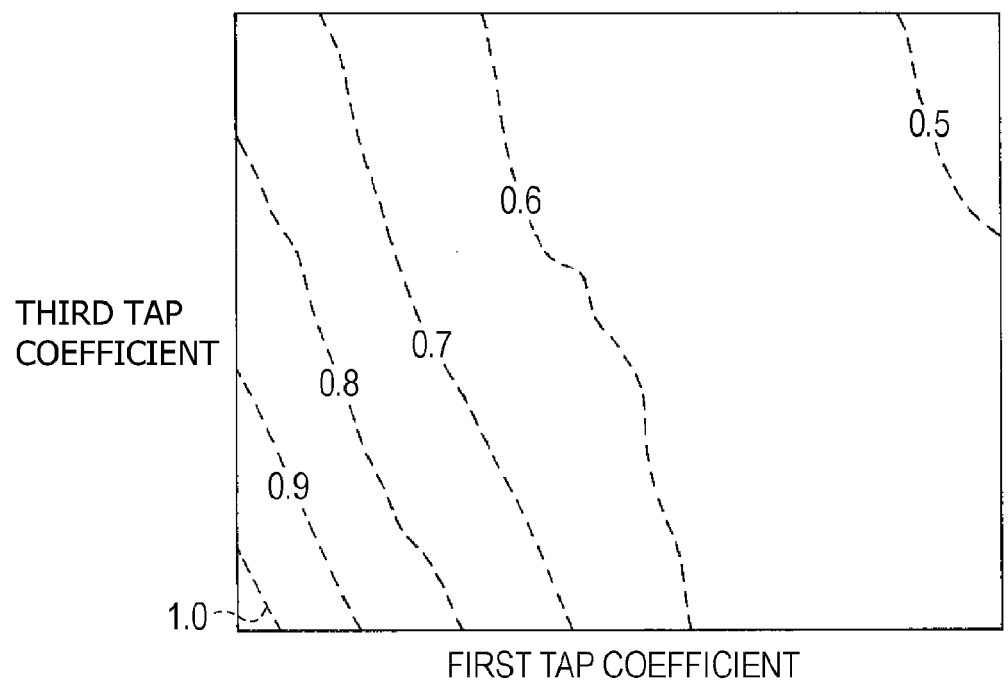

FIG. 13A illustrates an example of the result of simulation of the shift in the signal quality when the first and second tap coefficients are shifted in the EDC including four tap terminals. FIG. 13B illustrates an example of the result of simulation of the shift in the signal quality when the first and third tap coefficients are shifted in the EDC including four tap terminals. As in the result of simulation illustrated in FIG. 6, the value of the BER corresponding to each value of the first and second tap coefficients is represented by each broken line in FIG. 13A and the value of the BER corresponding to each value of the first and third tap coefficients is represented by each broken line in FIG. 13B. The values of the BERs illustrated in FIGS. 13A and 13B represent the relative values (dB) with respect to a predetermined BER value.

In the result of simulation when the first and fourth tap coefficients are shifted illustrated in FIG. 6, there is no large difference in the dependency of the BER between on the first tap coefficient and on the fourth tap coefficient, which are the tap coefficients of the tap terminals on both ends. In contrast, the dependency of the BER on the second and third tap coefficients, which are the tap coefficients of the intermediate tap terminals, is very small than that on the first tap coefficient. Accordingly, adjusting only both or one of the tap coefficients of the tap terminals on both ends by the tap-coefficient adjusting part 12 allows the control time to be reduced while keeping the effect of the adjustment of the tap coefficients. The same applies to the other embodiments.

FIG. 14 illustrates an example of the configuration of an optical receiver apparatus according to a third embodiment. The same reference numerals are used in FIG. 14 to identify the same components in the optical receiver apparatus according to the first embodiment illustrated in FIG. 2. A description of the same functions as in the optical receiver apparatus according to the first embodiment is omitted herein.

Referring to FIG. 14, the optical receiver apparatus 1 includes EDC controllers 30*a* and 30*b* controlling the tap coefficients of n-number of the EDCs 5*a* and 5*b*, respectively, and amplitude detectors 40*a* and 40*b* detecting the amplitudes of signals flowing through the branches B1 and B2, respectively, in addition to the components illustrated in FIG. 2.

The EDC controller 30*b* includes a tap-coefficient controlling part 11 controlling the tap coefficients for the dispersion compensation of the waveforms of signals, an amplitude controlling part 31, a multiplier 32, and a storage part 33. The EDC controller 30*a* has the same configuration as that of the EDC controller 30*b*. The tap-coefficient controlling part 11 functions in the same manner as in the tap-coefficient controlling part 11 illustrated in FIG. 2.

The amplitude controlling part 31 shifts the tap coefficients while keeping the ratio between the tap coefficients of all the tap terminals of the EDC 5*b*, in accordance with the amplitude of a signal flowing through the branch B2 detected by the amplitude detector 40*b*, to perform feedback control of the amplitude of a signal output from the EDC 5*b*.

For example, the amplitude controlling part 31 outputs an amplitude compensation signal common to all the tap terminals of the EDC 5*b*. The multiplier 32 multiplies each of the tap coefficients to be supplied from the tap-coefficient controlling part 11 to the EDC 5*b* by the amplitude compensation signal to shift the tap coefficients while keeping the ratio between the tap coefficients. The shift of the tap coefficients while keeping the ratio between the tap coefficients allows only the amplitude of the signal flowing through the branch B2 to be adjusted without varying the waveform of the signal.

Figure 15:
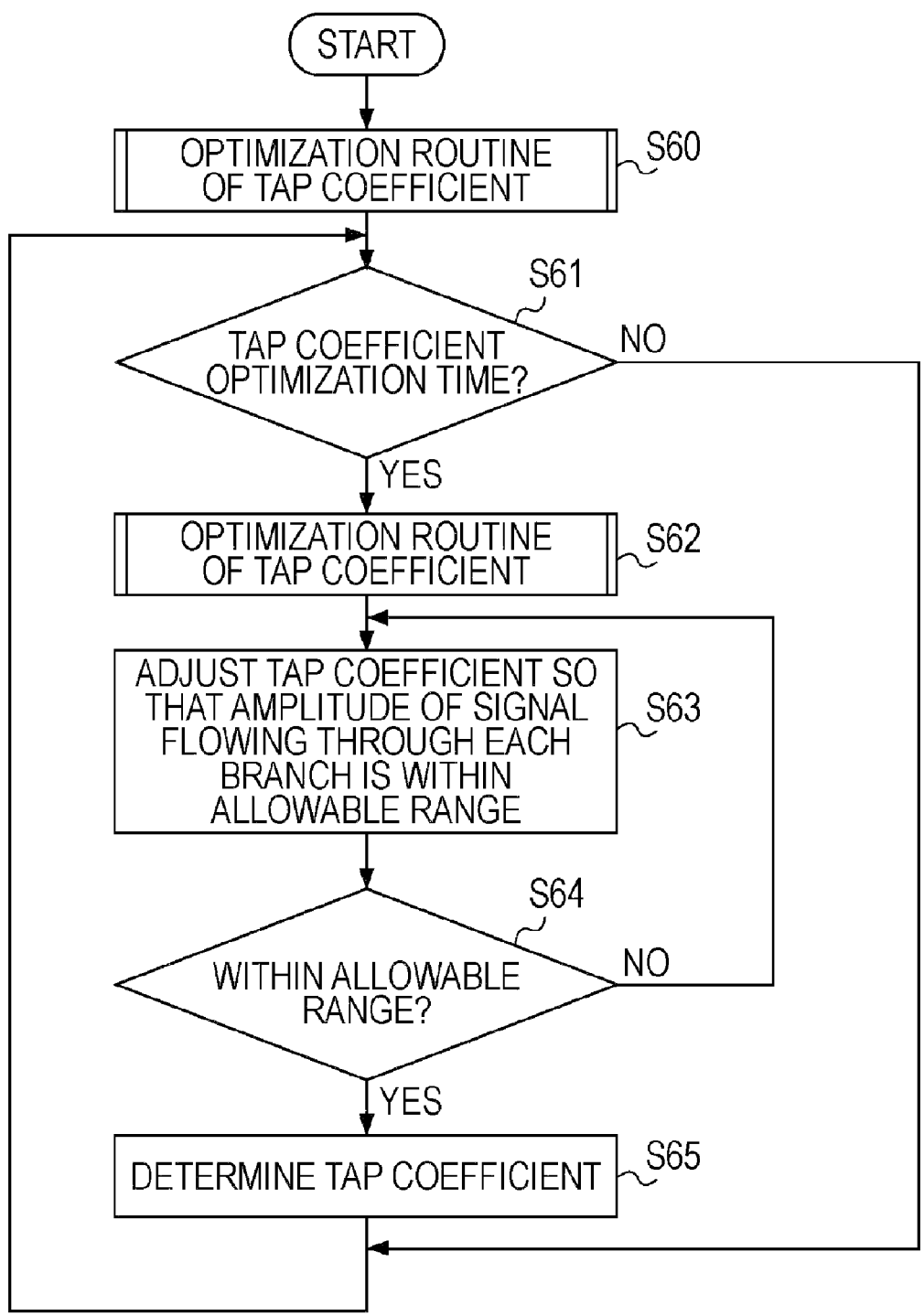
FIG. 15 illustrates an example of a method of controlling the tap coefficients according to the third embodiment.

FIG. 15 illustrates a method of controlling the tap coefficients according to the third embodiment. Although the adjustment of the tap coefficients of the EDC 5*b* by the EDC controller 30*b* will be described here, the tap coefficients of the EDC 5*a* are adjusted by the EDC controller 30*a* in the same manner as in the EDC 5*b*.

Referring to FIG. 15, Operations S60 to S62 are similar to Operations S10 to S12 illustrated in FIG. 3.

When the optimization of the tap coefficients by the tap-coefficient controlling part 11 is completed, in Operations S63 and S64, the amplitude controlling part 31 adjusts the tap coefficients so that the amplitude of the signal flowing through the branch B2, detected by the amplitude detector 40*b*, is within a predetermined allowable range.

For example, in Operation S63, the amplitude controlling part 31 shifts the value of the amplitude compensation signal by which the tap coefficients output from the tap-coefficient controlling part 11 is multiplied in the direction in which the amplitude of the signal is increased or decreased by a predetermined operation width. In Operation S64, the amplitude controlling part 31 determines whether the amplitude of the signal after the shift of the tap coefficients is within the predetermined allowable range. Operations S63 and S64 are repeated until the amplitude controlling part 31 determines that the amplitude of the signal after the shift of the tap coefficients is within the predetermined allowable range.

The predetermined allowable range may be, for example, the input rating range of the CDR circuits 61*a* and 61*b*.

If the amplitude controlling part 31 determines in Operation S64 that the amplitude of the signal after the shift of the tap coefficients is within the predetermined allowable range, then in Operation S65, the amplitude controlling part 31 stores the value of the amplitude compensation signal at that time in the storage part 33. The amplitude controlling part 31 subsequently uses the value stored in the storage part 33 as the value of the amplitude compensation signal. Then, the process goes back to Operation S61.

With the above method, the optical receiver apparatus 1 is capable of setting the amplitude of the signal after the dispersion compensation within the predetermined allowable range. Accordingly, since the amplitude of the signal input into the downstream elements is set within the rating, it is possible to reduce the degradation in the signal quality owing to the downstream elements. In the example of the configuration according to the third embodiment, the amplitudes of the signals input into the CDR circuits 61*a* and 61*b* are set within the input rating range of the CDR circuits 61*a* and 61*b*.

Figure 16:
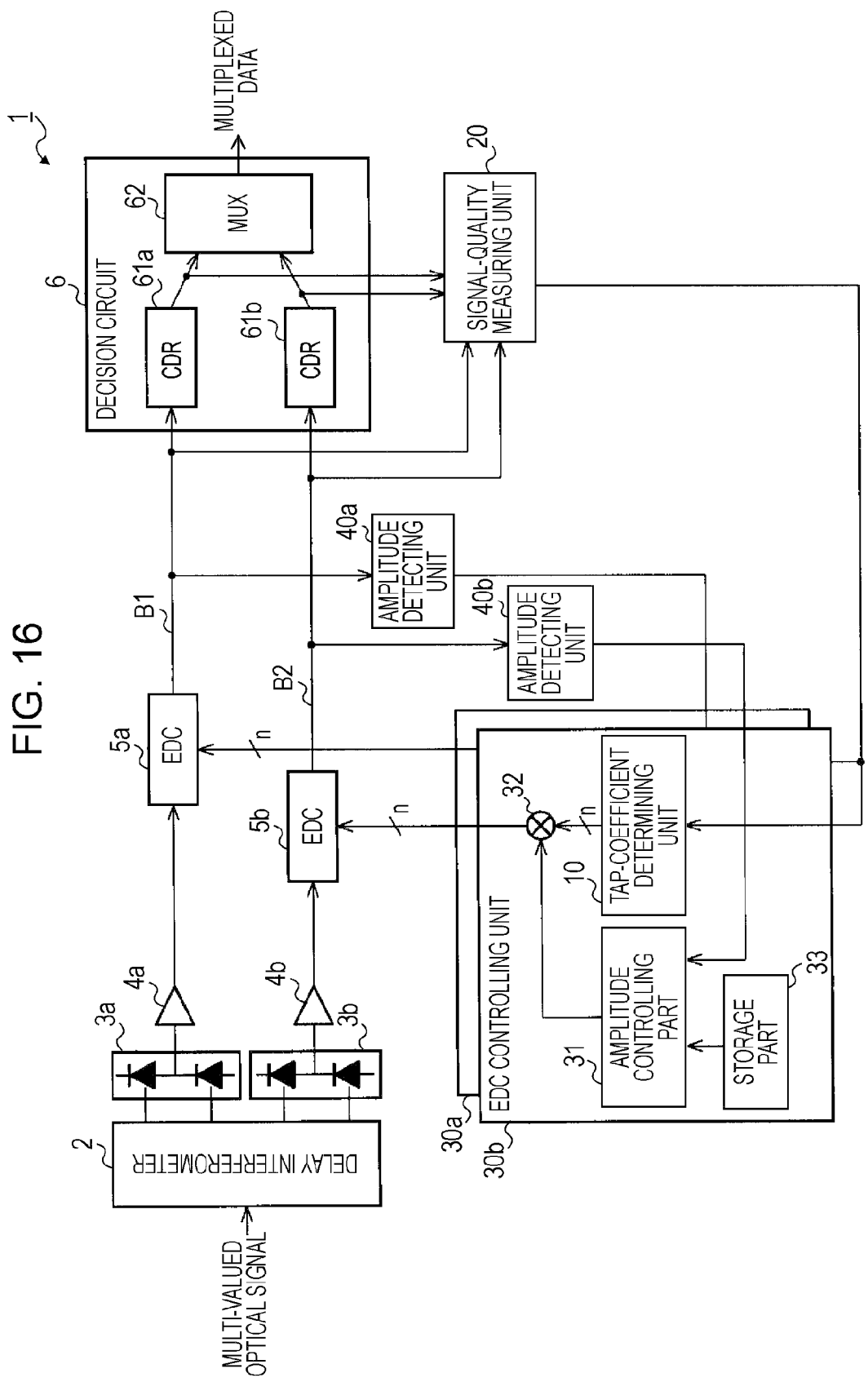
FIG. 16 illustrates an example of the configuration of an optical receiver apparatus according to a fourth embodiment.

FIG. 16 illustrates an example of the configuration of an optical receiver apparatus according to a fourth embodiment. The optical receiver apparatus 1 according to the fourth embodiment adopts the tap-coefficient determining unit 10 described above with reference to FIGS. 2 and 7 as the tap-coefficient controlling means for controlling the tap coefficients for the dispersion compensation of the waveforms of signals in the EDC controllers 30*a* and 30*b*. The tap-coefficient determining unit 10 may be used as the tap-coefficient controlling means in the other embodiments.

Figure 17:
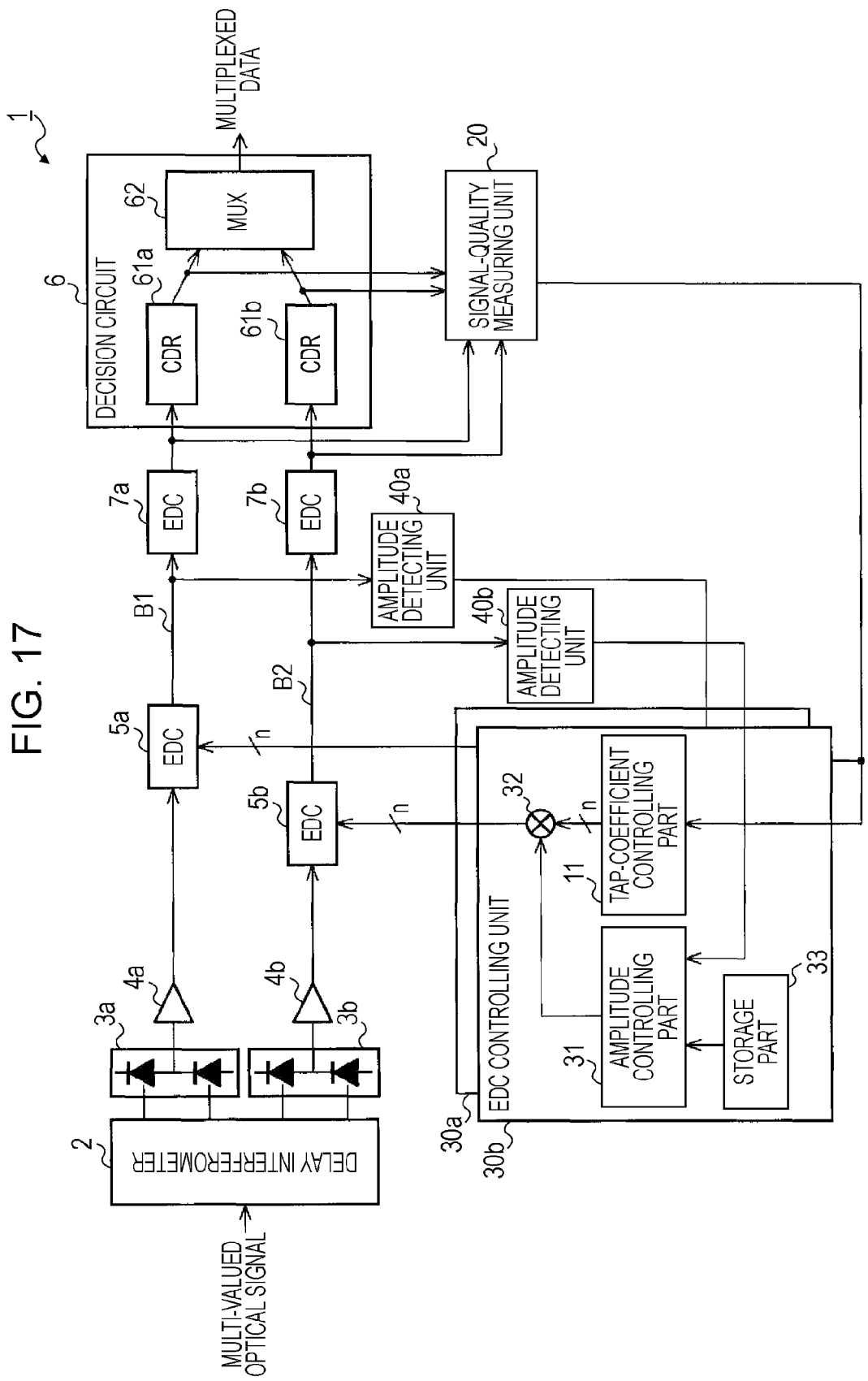
FIG. 17 illustrates an example of the configuration of an optical receiver apparatus according to a fifth embodiment.
Figure 18:
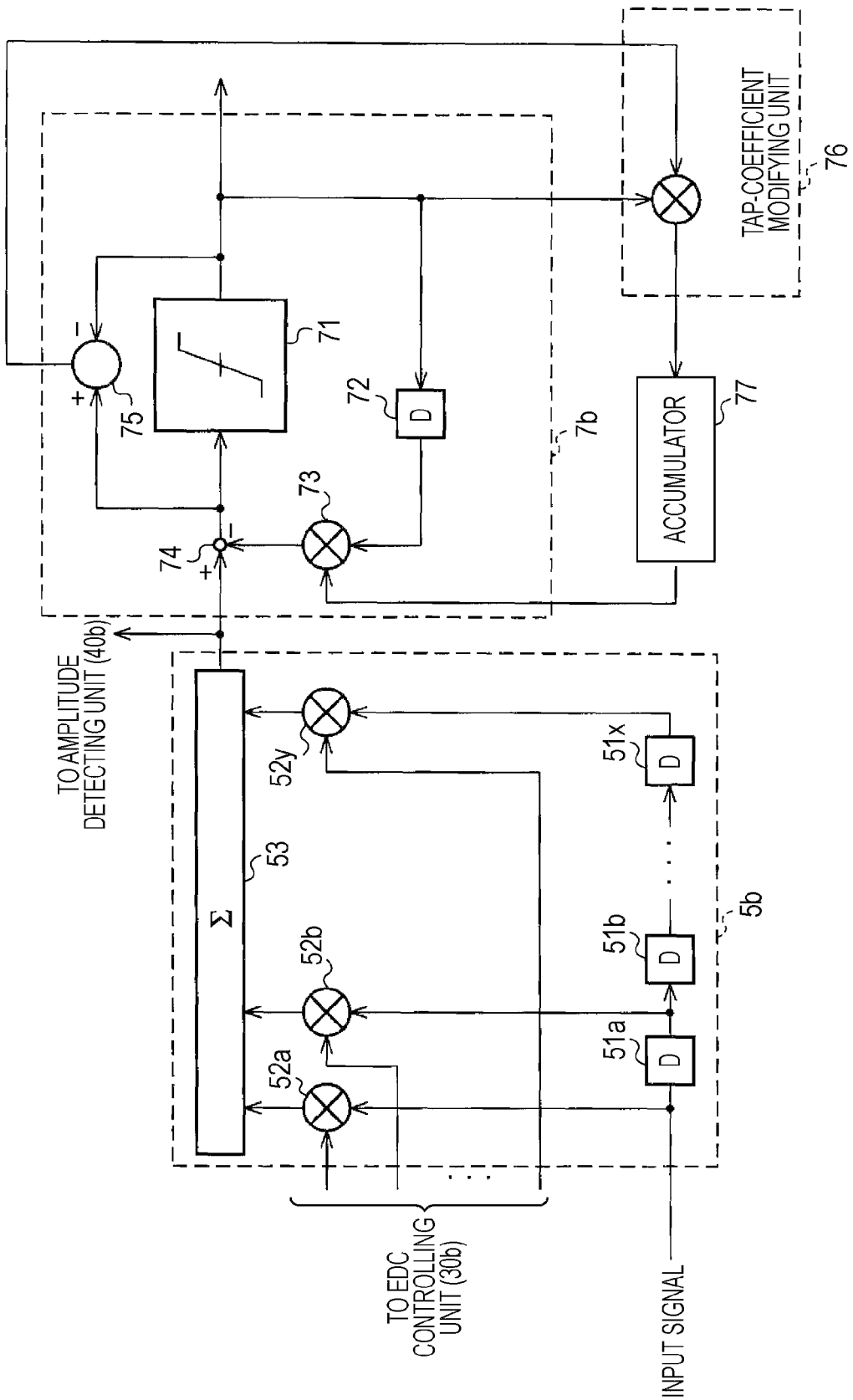
FIG. 18 illustrates an example of the configuration of EDCs illustrated in FIG. 17.

FIG. 17 illustrates an example of the configuration of an optical receiver apparatus according to a fifth embodiment. In the example of the configuration illustrated in FIG. 17, the signals output from the EDCs 5*a* and 5*b* controlled by the EDC controllers 30*a* and 30*b* are input into other EDCs 7*a* and 7*b*, respectively. FIG. 18 illustrates an example of the configuration of the EDC 5*b* and the EDC 7*b* illustrated in FIG. 17.

Referring to FIG. 18, the EDC 5*b* includes a transversal filter serving as a feed-forward equalizer (FFE). The EDC 5*b* includes delay elements 51*a*, 51*b*, . . . , and 51*x*, multipliers 52*a*, 52*b*, . . . , and 52*y* that multiply the signals from the different delay elements by the tap coefficients, and an adder 53 that adds up the outputs from the multipliers 52*a*, 52*b*, . . . , and 52*y*.

The EDC 7*b* includes a transversal filter serving as a decision feedback equalizer (DFE). The EDC 7*b* includes a determiner 71, a feedback filter including a delay element 72 and a multiplier 73 multiplying the delay signal from the delay element 72 by the tap coefficient, and a subtractor 74 subtracting the signal fed back from the feedback filter from the signal that is input.

A tap-coefficient modifying unit 76 calculates the product of the equalization difference, which is the difference between the signal input into the determiner 71 and the signal output from the determiner 71, and the output signal from the determiner 71. An accumulator 77 accumulates the products calculated by the tap-coefficient modifying unit 76 to generate the tap coefficients for the EDC 7*b*.

The amplitude of the signal input into the determiner 71 in the EDC 7*b* serving as the DFE is set within a predetermined range in the configuration according to the fifth embodiment, so that the accuracy of the result of the determination by the determiner 71 is improved.

Figure 19:
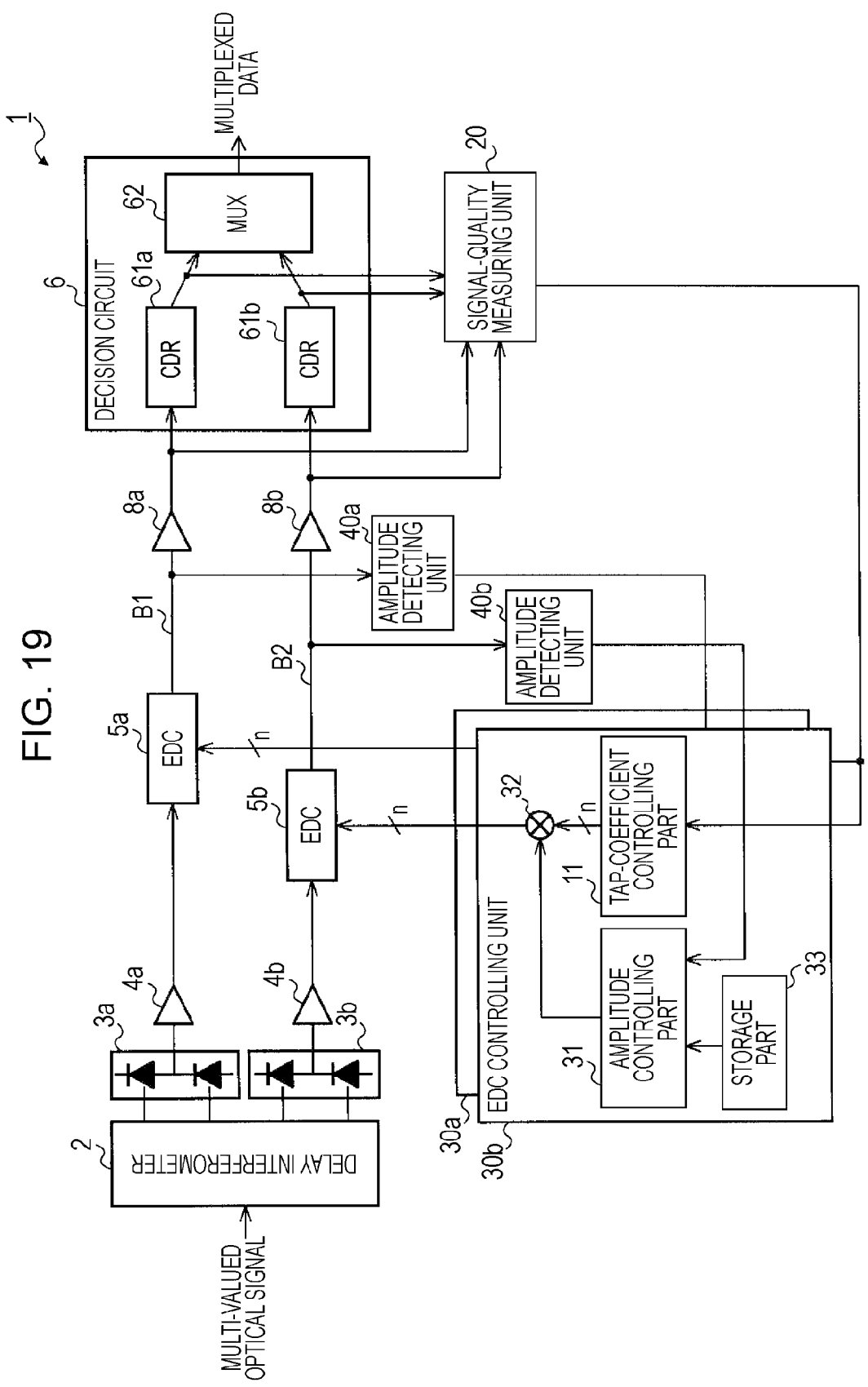
FIG. 19 illustrates an example of the configuration of an optical receiver apparatus according to a sixth embodiment.

FIG. 19 illustrates an example of the configuration of an optical receiver apparatus according to a sixth embodiment. In the configuration according to the sixth embodiment, the signals output from the EDCs 5a and 5b controlled by the EDC controllers 30a and 30b are input into amplifiers 8a and 8b, respectively. With this configuration, the amplitudes of the signals input into the amplifiers 8a and 8b through the branches B1 and B2, respectively, are set within the input rating of the amplifiers 8a and 8b.

FIG. 20 illustrates an example of the configuration of an optical receiver apparatus according to a seventh embodiment. The same reference numerals are used in FIG. 20 to identify the same components in the optical receiver apparatus according to the third embodiment illustrated in FIG. 14. A description of the same functions as in the optical receiver apparatus in FIG. 14 is omitted herein.

Referring to FIG. 20, the optical receiver apparatus 1 includes a calculator 9 that calculates the difference and the sum of the amplitudes of the signals flowing through the branches B1 and B2, detected by the amplitude detectors 40a and 40b, respectively, in addition to the components illustrated in FIG. 14.

The amplitude controlling part 31 adjusts the tap coefficients of the EDCs 5a and 5b so that the amplitudes detected by the amplitude detectors 40a and 40b are set within a predetermined range, as described above, and so that the difference in the amplitude between the signals flowing through the branches B1 and B2 is decreased. For example, the amplitude controlling part 31 adjusts the tap coefficients so as to increase the level of the signal having the smaller amplitude, among the signals flowing through the branches B1 and B2, and to decrease the level of the signal having the larger amplitude thereamong, to decrease the difference in the amplitude between the signals flowing through the branches B1 and B2.

Since there are differences in characteristics between the delay interferometer 2, the balanced diodes 3a and 3b, the amplifiers 4a and 4b, and the EDCs 5a and 5b provided on the branches B1 and B2, respectively, the signals flowing through the branches B1 and B2 differ in the amplitude and/or the delay time. Since the presence of the differences between the branches narrows the range of the signal level and/or the time which the decision circuit 6 is capable of accurately determining, the error ratio of the determination by the decision circuit 6 is increased.

With the configuration according to the seventh embodiment illustrated in FIG. 20, the difference in the amplitude between the branches is reduced to improve the accuracy of the determination by the decision circuit 6. Since the variation in the amplitude between the branches, caused by the difference in the delay time between the branches, is also reduced, the signal quality is possibly improved.

Furthermore, the amplitude controlling part 31 adjusts the tap coefficients of the EDCs 5a and 5b so that the amplitudes detected by the amplitude detectors 40a and 40b are set within a predetermined range, as described above, and so that the sum of the amplitudes of the signals flowing through the branches B1 and B2 is set with in a predetermined range. Consequently, it is possible to control the tap coefficients so that the average level of the signals flowing through the branches B1 and B2 is set within a predetermined range.

With the apparatus and the method according to the embodiments, it is possible to smoothly perform the variable control of the tap coefficients of the transversal filter in the optical receiver apparatus performing the waveform equalization of a received signal by using the electronic dispersion compensator.

As described above, the apparatuses of controlling the tap coefficients according to the embodiments each include an oscillator circuit generating a certain oscillation signal; an adder periodically adding the oscillation signal to the tap coefficient of any of one or more taps of each transversal filter; a signal-quality measurer measuring the signal quality of a signal output from the transversal filter; and a tap-coefficient adjuster controlling the value of the tap coefficient so that an optimal amount of shift in the signal quality of the output signal is achieved when the oscillation signal is added to the tap coefficient.

The signal quality of the signal subjected to the waveform equalization in the transversal filter is dependent on the tap coefficients, and the amount of shift in the signal quality is greatly increased if the tap coefficients are shifted from the optimal value. Accordingly, the control of the tap coefficients by using the amount of shift in the signal quality appearing when the oscillation signals are added to the tap coefficients to shift the tap coefficients as the index allows the tap coefficients to be rapidly converged into the optimal value.

The apparatuses of controlling the tap coefficient according to the embodiments each include a signal-quality measurer measuring the signal quality of a signal output from a transversal filter; a tap-coefficient controller controlling the tap coefficient of each tap of the transversal filter so that the optimal signal quality is achieved; an amplitude detector detecting the amplitude of the signal output from the transversal filter; and an amplitude controller shifting the tap coefficients while keeping the ratio between the tap coefficients of all the taps in the transversal filter in accordance with the detected amplitude of the output signal to perform the feedback control of the amplitude of the output signal. The control of the amplitude of the signal output from the transversal filter prevents the amplitude of the signal input into the downstream elements from exceeding the rating range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an oscillator circuit configured to generate a certain oscillation signal;
   an adder configured to add the oscillation signal to the tap coefficient of any of one or more taps of a transversal filter;
   a signal-quality measurer configured to measure a signal quality of a signal output from the transversal filter; and
   a tap-coefficient adjuster configured to control the value of the tap coefficient so that an optimal amount of shift in the signal quality of the output signal is achieved when the oscillation signal is added to the tap coefficient.

2. The apparatus according to claim 1, further comprising:
a phase controller configured to control the phase of a periodic signal output from the oscillator circuit as the oscillation signal,
wherein the transversal filter includes two or more taps,
wherein the oscillator circuit generates a plurality of periodic signals that are concurrently added to the tap coefficients of the multiple taps, and
wherein the phase controller differentiates the phase of the periodic signal added to at least one tap coefficient from the phase of the periodic signal added to another at least one tap coefficient.

3. The apparatus according to claim 1, further comprising:
a frequency controller configured to control the frequency of a periodic signal output from the oscillator circuit as the oscillation signal,
wherein the transversal filter includes two or more taps,
wherein the oscillator circuit generates a plurality of periodic signals that are concurrently added to the tap coefficients of the multiple taps, and
wherein the frequency controller differentiates the frequency of the periodic signal added to at least one tap coefficient from the frequency of the periodic signal added to another at least one tap coefficient.

4. The apparatus according to claim 1,
wherein the transversal filter includes two or more taps, and
wherein the oscillation signal is added to one or both of the tap coefficients of the taps on both ends of the transversal filter.

5. An optical receiver apparatus comprising:
the apparatus of controlling a tap coefficient of a transversal filter according to claim 1;
a demodulation circuit configured to demodulate a multi-valued optical signal that is received into an electrical signal; and
the transversal filter configured to perform waveform equalization of the electrical signal demodulated by the demodulation circuit, the tap coefficient of the transversal filter being controlled by the apparatus of controlling the tap coefficient.

6. An optical communication system comprising:
the optical receiver apparatus according to claim 5;
an optical transmitter apparatus configured to modulate a transmission signal into a multi-valued optical signal and to transmit the multi-valued optical signal to the optical receiver apparatus; and
an optical transmission line provided between the optical receiver apparatus and the optical transmitter apparatus.

7. A method of controlling a tap coefficient of a transversal filter, the method comprising:
periodically adding a certain oscillation signal to the tap coefficient of any of one or more taps of the transversal filter;
measuring a signal quality of a signal output from the transversal filter; and
controlling the value of the tap coefficient so that an optimal amount of shift in the signal quality of the output signal is achieved when the oscillation signal is added to the tap coefficient.

8. The method of controlling a tap coefficient of a transversal filter according to claim 7, the transversal filter including two or more taps, the method further comprising:
concurrently adding a plurality of periodic signals as the oscillator signal to the tap coefficients of the multiple taps; and
differentiating the phase of the periodic signal added to at least one tap coefficient from the phase of the periodic signal added to another at least one tap coefficient.

9. The method of controlling a tap coefficient of a transversal filter according to claim 7, the transversal filter including two or more taps, the method further comprising:
concurrently adding a plurality of periodic signals as the oscillator signal to the tap coefficients of the multiple taps; and
differentiating the frequency of the periodic signal added to at least one tap coefficient from the frequency of the periodic signal added to another at least one tap coefficient.

10. The method of controlling a tap coefficient of a transversal filter according to claim 7,
wherein the transversal filter includes two or more taps, and
wherein the oscillation signal is added to one or both of the tap coefficients of the taps on both ends of the transversal filter.

* * * * *

UNITED STATES PATENT AND TRADEMARK OFFICE
CERTIFICATE OF CORRECTION

PATENT NO.        : 8,165,465 B2                                         Page 1 of 1
APPLICATION NO.   : 12/397755
DATED             : April 24, 2012
INVENTOR(S)       : Toshiki Tanaka et al.

It is certified that error appears in the above-identified patent and that said Letters Patent is hereby corrected as shown below:

Column 16, Line 59, In Claim 1, delete "the tap" and insert -- a tap --, therefor.

Signed and Sealed this
Third Day of July, 2012

David J. Kappos
*Director of the United States Patent and Trademark Office*